(12) United States Patent
Muruganathan et al.

(10) Patent No.: US 12,156,204 B2
(45) Date of Patent: Nov. 26, 2024

(54) PHYSICAL DOWNLINK SHARED CHANNEL (PDSCH) RESOURCE MAPPING FOR MULTI-TRANSMISSION POINT (TRP)

(71) Applicant: Telefonaktiebolaget LM Ericsson (publ), Stockholm (SE)

(72) Inventors: Siva Muruganathan, Stittsville (CA); Mattias Frenne, Uppsala (SE); Sebastian Faxér, Stockholm (SE); Simon Järmyr, Skarpnäck (SE); Shiwei Gao, Nepean (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 426 days.

(21) Appl. No.: 17/421,207

(22) PCT Filed: Jan. 9, 2020

(86) PCT No.: PCT/IB2020/050160
§ 371 (c)(1),
(2) Date: Jul. 7, 2021

(87) PCT Pub. No.: WO2020/144626
PCT Pub. Date: Jul. 16, 2020

(65) Prior Publication Data
US 2022/0070901 A1    Mar. 3, 2022

Related U.S. Application Data

(60) Provisional application No. 62/790,736, filed on Jan. 10, 2019.

(51) Int. Cl.
*H04W 72/1273*    (2023.01)
*H04L 5/00*    (2006.01)
(Continued)

(52) U.S. Cl.
CPC ....... *H04W 72/1273* (2013.01); *H04L 5/0051* (2013.01); *H04W 72/23* (2023.01); *H04W 72/542* (2023.01)

(58) Field of Classification Search
USPC ......................................................... 370/329
See application file for complete search history.

(56) References Cited

U.S. PATENT DOCUMENTS

2019/0082431 A1\* 3/2019 Yi ..................... H04W 72/0446
2019/0150123 A1\* 5/2019 Nogami ................ H04W 72/23
370/330
(Continued)

FOREIGN PATENT DOCUMENTS

CN    104054313 A    9/2014
WO    2013/058585 A1    4/2013
(Continued)

OTHER PUBLICATIONS

Chinese Office Action and English summary translation of the Chinese Office Action dated Aug. 12, 2023 issued in corresponding Chinese Application No. 202080008919.9, consisting of 14 pages.
(Continued)

*Primary Examiner* — Gregory B Sefcheck
*Assistant Examiner* — Majid Esmaeilian
(74) *Attorney, Agent, or Firm* — Weisberg I.P. Law, P.A.

(57) ABSTRACT

Methods and apparatuses are disclosed for resource mapping. In one embodiment, a wireless device is provided. The wireless device includes processing circuitry (84) configured to: receive a plurality of physical downlink control channel, PDCCH, transmissions where the plurality of PDCCH transmissions includes a 5 plurality of downlink control information, DCI, messages scheduling a plurality of physical downlink shared channel, PDSCH, transmissions, and at least two of the plurality of PDSCH transmissions one
(Continued)

of partially and fully overlap in a time domain; and perform PDSCH resource mapping for decoding the plurality of PDSCH transmissions based at least in part on the plurality of DCI messages.

16 Claims, 18 Drawing Sheets

(51) Int. Cl.
*H04W 72/23* (2023.01)
*H04W 72/542* (2023.01)

(56) References Cited

U.S. PATENT DOCUMENTS

| | | | |
|---|---|---|---|
| 2019/0222357 A1* | 7/2019 | Huang | H04L 5/0094 |
| 2019/0222400 A1* | 7/2019 | Bagheri | H04L 1/0072 |
| 2020/0067676 A1* | 2/2020 | Yi | H04W 72/0446 |
| 2020/0196343 A1* | 6/2020 | Marinier | H04L 1/1896 |
| 2021/0058207 A1* | 2/2021 | Lee | H04L 5/0007 |
| 2021/0084621 A1* | 3/2021 | Kim | H04W 72/23 |

FOREIGN PATENT DOCUMENTS

| | | |
|---|---|---|
| WO | 2017/135185 A1 | 11/2018 |
| WO | 2020/076830 A1 | 4/2020 |

OTHER PUBLICATIONS

3GPP TSG RAN WG1 Meeting #94bis; R1-1811882; Source: Huawei, HiSilicon; Title: Summary of AI: 7.2.8.2 Enhancements on Multi-TRP/Panel Transmission; Document for: Discussion and Decision; Agenda Item: 7.2.8.2; Chengdu, China, Oct. 8-12, 2018, consisting of 22 pages.
3GPP TSG RAN WG1 Meeting #94bis; R1-1810790; Source: Intel Corporation; Title: Discussion on multi-TRP/multi-panel transmission; Agenda Item: 7.2.8.2; Document for: Discussion and Decision; Chengdu, China, Oct. 8-12, 2018, consisting of 10 pages.
International Search Report and Written Opinion dated Mar. 20, 2020 issued in PCT Application No. PCT/IB2020/050160, consisting of 15 pages.
Huawei, HiSilicon 3GPP TSG RAN WG1 Meeting #95; R1-1813991; Title: Maintenance for CSI-RS #1; Agenda Item: 7.1.2.4; Document for: Discussion and Decision, Spokane, USA, Nov. 12-16, 2018, consisting of 15 pages.
Huawei, HiSilicon 3GPP TSG RAN WG1 Meeting #95; R1-1814002; Title: Summary of AI: 7.2.8.2 Enhancements on Multi-TRP/Panel Transmission; Agenda Item: 7.2.8.2; Document for: Discussion and Decision, Spokane, USA, Nov. 12-16, 2018, consisting of 32 pages.
Intel Corporation 3GPP TSG RAN WG1 Meeting #95; R1-1812509; Title: Discussion on Multi-TRP/Multi-Panel Transmission; Agenda Item: 7.2.8.2; Document for: Discussion and Decision, Spokane, USA, Nov. 12-16, 2018, consisting of 14 pages.
3GPP TS 38.331 V15.3.0 (Sep. 2018) 3rd Generation Partnership Project; Technical Specification Group Radio Access Network; NR; Radio Resource Control (RRC) Protocol Specification (Release 15), consisting of 445 pages.
Indian Examination Report dated Mar. 14, 2022, issued in corresponding Indian Application No. 202147035499, consisting of 6 pages.
European Communication Pursuant to Article 94(3) EPC dated Mar. 1, 2023, issued in corresponding European Application No. 20 702 355.7, consisting of 6 pages.
Korean Office Action and English summary translation of the Korean Office Action dated May 13, 2024 issued in corresponding Korean Application No. 2021-7025167, consisting of 8 pages.
3GPP TSG RAN WG1 Meeting #95, R1-1812243, Spokane, USA, Nov. 12-16, 2018, Agenda Item: 7.2.8.2, Source: Hauawei, HiSilicon, Title: Enhancements on multi-TRP/panel transmission, Document for: Discussion and Decision, consisting of 9 pages.
3GPP TSG-RAN WG1 NR1801, Vancouver, Canada, Jan. 22-26, 2018, R1-1800553, Agenda Item: 7.3.5, Source: Nokia, Nokia Shanghai Bell, Title: On remaining details of PDSCH rate-matching in NR, Document for: Discussion and Decision, consisting of 6 pages.
Korean Notice of Allowance and machine English translation of the Korean Notice of Allowance dated Sep. 10, 2024 issued in corresponding Korean Application No. 2021-7025167, consisting of 8 pages.
3GPP TSG-RAN WG1 NR Ad Hoc #3 R1-1716345; Nagoya, Japan, Sep. 18-21, 2017 Source: Ericsson; Title: Multi-TRP and multi-panel transmission; Agenda Item: 6.2.1.6; Document for: Discussion and Decision, consisting of 8 pages.
3GPP TSG-RAN WG1 Meeting #95 R1-1813442; Nov. 12-16, 2018 Spokane, WA, USA; Agenda item: 7.2.8.2; Source: Qualcomm Incorporated; Title: Multi-TRP Enhancements; Document for: Discussion/ Decision, consisting of 20 pages.

* cited by examiner

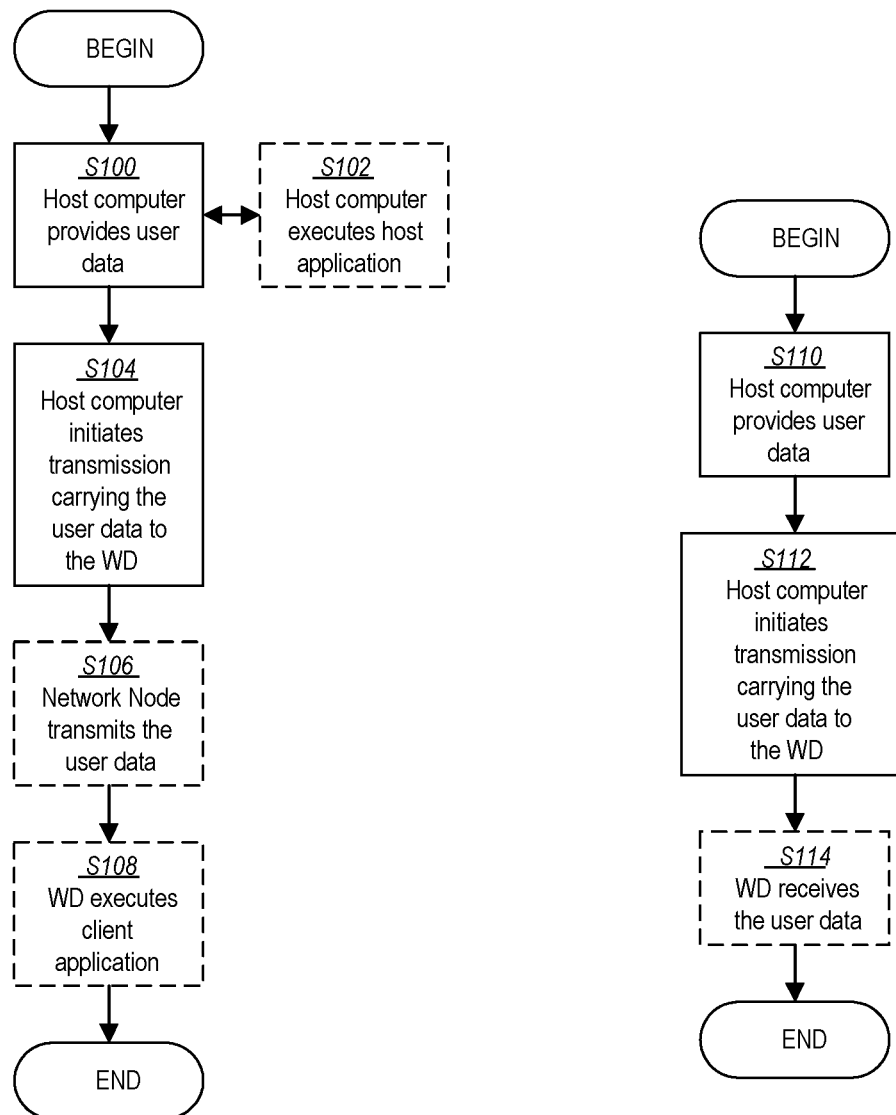

PHYSICAL DOWNLINK SHARED CHANNEL (PDSCH) RESOURCE MAPPING FOR MULTI-TRANSMISSION POINT (TRP)

CROSS-REFERENCE TO RELATED APPLICATIONS

This application is a Submission Under 35 U.S.C. § 371 for U.S. National Stage Patent Application of International Application No.: PCT/IB2020/050160, filed Jan. 9, 2020 entitled "PHYSICAL DOWNLINK SHARED CHANNEL (PDSCH) RESOURCE MAPPING FOR MULTI-TRANSMISSION POINT (TRP)," which claims priority to U.S. Provisional Application No. 62/790,736, filed Jan. 10, 2019, entitled "PHYSICAL DOWNLINK SHARED CHANNEL (PDSCH) RESOURCE MAPPING FOR MULTI-TRANSMISSION POINT (TRP)," the entireties of both of which are incorporated herein by reference.

TECHNICAL FIELD

The present disclosure relates to wireless communications, and in particular, to PDSCH resource mapping for multi-transmission point communications.

BACKGROUND

New Radio

The new $5^{th}$ Generation (5G) or new radio (NR) $3^{rd}$ Generation Partnership Project (3GPP) mobile wireless communication system supports a diverse set of use cases and a diverse set of deployment scenarios.

NR may use Cyclic Prefix Orthogonal Frequency Division Multiplexing (CP-OFDM) in the downlink (i.e., from a network node (e.g., gNB, eNB, or base station) to a wireless device (WD) (e.g., user equipment or UE)) and both CP-OFDM and Discrete Fourier transform (DFT)-spread OFDM (DFT-S-OFDM) in the uplink (i.e., from WD to network node). In the time domain, NR downlink and uplink physical resources may be organized into equally-sized subframes of 1 millisecond (ms) each. A subframe may be further divided into multiple slots of equal duration.

The slot length may depend on subcarrier spacing. For subcarrier spacing of $\Delta f=15$ kHz, there may only be one slot per subframe and each slot may include 14 OFDM symbols, irrespectively of the subcarrier spacing.

Typical data scheduling in NR may be on a per-slot basis, an example of which is shown in FIG. 1, where the first two symbols contain physical downlink control channel (PDCCH) and the remaining 12 symbols contain physical data channel (PDCH), either a physical downlink data channel (PDSCH) or physical uplink data channel (PUSCH).

Different subcarrier spacing values are supported in NR. The supported subcarrier spacing values (also referred to as different numerologies) are given by $\Delta f=(15 \times 2^{\alpha})$ kHz where $\alpha$ is a non-negative integer. $\Delta f=15$ kHz is the basic subcarrier spacing that is also used in LTE. The slot durations at different subcarrier spacings are shown in Table 1, as an example.

TABLE 1

Slot length at different numerologies.

| Numerology | Slot length | RB BW |
|---|---|---|
| 15 kHz | 1 ms | 180 kHz |
| 30 kHz | 0.5 ms | 360 kHz |
| 60 kHz | 0.25 ms | 720 kHz |
| 120 kHz | 125 μs | 1.44 MHz |
| 240 kHz | 62.5 μs | 2.88 MHz |

In the frequency domain, a system bandwidth may be divided into resource blocks (RBs), each RB corresponding to 12 contiguous subcarriers. The common RBs (CRB) are numbered starting with 0 from one end of the system bandwidth. The WD may be configured with one or up to four bandwidth parts (BWPs), which may be a subset of the RBs supported on a carrier. Hence, a BWP may start at a CRB larger than zero. All configured BWPs may have a common reference, e.g., the CRB 0. Hence, a WD can be configured with a narrow BWP (e.g., 10 MHz) and a wide BWP (e.g., 100 MHz), but only one BWP may be active for the WD at a given point in time. The physical RB (PRB) may be numbered from 0 to N-1 within a BWP (but the 0:th PRB may thus be the K:th CRB where K>0).

An example of the basic NR physical time-frequency resource grid is illustrated in FIG. 2, where only one resource block (RB) within a 14-symbol slot is shown. One OFDM subcarrier during one OFDM symbol interval forms one resource element (RE).

Downlink transmissions can be dynamically scheduled, i.e., in each slot the network node (e.g., gNB) transmits downlink control information (DCI) over PDCCH about which WD data is to be transmitted to and which RBs in the current downlink slot the data is transmitted on. PDCCH is typically transmitted in the first one or two OFDM symbols in each slot in NR. The WD data may be carried on PDSCH. A WD first detects and decodes PDCCH and if the decoding is successful, the WD then decodes the corresponding PDSCH based on the decoded control information in the PDCCH.

Uplink data transmission can also be dynamically scheduled using PDCCH. Similar to downlink, a WD first decodes uplink grants in PDCCH and then transmits data over PUSCH based the decoded control information in the uplink grant such as modulation order, coding rate, uplink resource allocation, etc.

In order to increase reliability of a data packet, the data payload can be encoded with different redundancy versions (RVs). This is commonly used in Long Term Evolution (LTE) and NR in retransmissions where in each such transmission a different RV is used (RV=0, 1, 2, 3). In NR, scheduling a PDSCH or PUSCH may be possible with time repetition, by the RRC parameters pdsch-AggregationFactor, pusch-AggregationFactor (for dynamically scheduled PUSCH), and repK (for PUSCH of UL configured grant). In this case, the PDSCH or PUSCH may be scheduled but transmitted in multiple adjacent slots up until the number of repetitions as determined by the configured Radio Resource Control (RRC) parameter.

PDSCH Resource Mapping

In NR, a virtual circular buffer may be used to match any available code rate by selecting or pruning bits in the buffer. This rate matching may be useful since the number of available REs for a WD in a slot may vary due to the presence or absence of various control channel signals, reserved resources, or reference signals. For example, the number of REs for PDSCH in a subframe configured with Channel State Information-Reference Signal (CSI-RS) would be different from the number of REs in subframes without CSI-RS. The rate matching can be used to adapt the variations of the available PDSCH REs in this case for a scheduled resource of one or multiple resources blocks and between two to fourteen OFDM symbols. Note that in this case, both the network node (e.g., gNB) and the WD may know the exact number of available PDSCH REs and the RE locations in a RB and in the scheduled resources. This PDSCH-to-RE mapping information may be used for correct PDSCH decoding; because otherwise, there could be a mismatch between the REs a PDSCH is transmitted on and the REs over which the PDSCH is received and decoded. Note that in this disclosure, the phrases 'PDSCH resource mapping' and 'PDSCH rate matching' are used alternatingly and/or interchangeably.

PDSCH Resource Mapping with RB Symbol-Level Granularity

3GPP NR Release 15 (Rel-15) may support rate matching patterns (resources not available for PDSCH-to-RE mapping) with RB and symbol-level granularity that can be used for PDSCH resource mapping. When a WD is configured with such a rate matching pattern, the REs included in that rate matching pattern may be declared as unavailable for PDSCH. In 3GPP NR Rel-15, a rate matching pattern with RB and symbol-level granularity may be configured by the network to the WD via higher layer parameter, e.g., RateMatchPattern.

A list, rateMatchPatternToAddModList, of RateMatchPattern(s) can be given in a configuration by PDSCH-Config or by ServingCellConfigCommon. When rateMatchPatternToAddModList is given by PDSCH-Config configuration, rateMatchPatternToAddModList may be defined on a bandwidth part (BWP)-level, i.e. within a BWP. When rateMatchPatternToAddModList is given by ServingCellConfigCommon, rateMatchPatternToAddModList may be defined on a serving cell-level, i.e. irrespectively of the BWP configuration. Up to 4 RateMatchPattern(s) can be defined on a BWP-level to a WD, and up to 4 RateMatchPattern(s) can be defined on a cell-level (common to all WDs served by the cell). The RateMatchPattern, PDSCH-Config and ServingCellConfigCommon information elements as specified in 3rd Generation Partnership Project (3GPP) Technical Specification (TS) 38.331 V15.3.0 are shown below, as examples.

RateMatchPattern information element:
-- ASN1START
-- TAG-RATEMATCHPATTERN-START
RateMatchPattern::=SEQUENCE {
  rateMatchPatternId
  patternType CHOICE {
    bitmaps SEQUENCE {
      resourceBlocks BIT STRING (SIZE (275)),
      symbols InResourceBlock CHOICE {
        oneSlot BIT STRING (SIZE (14)),
        twoSlots BIT STRING (SIZE (28))
      },
      periodicity AndPattern CHOICE {
        n2 BIT STRING (SIZE (2)),
        n4 BIT STRING (SIZE (4)),
        n5 BIT STRING (SIZE (5)),
        n8 BIT STRING (SIZE (8)),
        n10 BIT STRING (SIZE (10)),
        n20 BIT STRING (SIZE (20)),
        n40 BIT STRING (SIZE (40))
      } OPTIONAL, -- Need S
      . . .
    },
    controlResourceSet ControlResourceSetId
  },
  subcarrierSpacing OPTIONAL, -- Cond CellLevel
  dummy . . . ENUMERATED {dynamic, semiStatic},
  . . .
}
-- TAG-RATEMATCHPATTERN-STOP
-- ASN1STOP PDSCH-Config information element:
-- ASN1START
-- TAG-PDSCH-CONFIG-START
PDSCH-Config::=SEQUENCE {
  dataScramblingIdentityPDSCH INTEGER (0 . . . 1023) OPTIONAL, -- Need S
  dmrs-DownlinkForPDSCH-MappingTypeA SetupRelease {DMRS-DownlinkConfig} OPTIONAL, -- Need M
  dmrs-DownlinkForPDSCH-MappingTypeB SetupRelease {DMRS-DownlinkConfig} OPTIONAL, -- Need M
  tci-StatesToAddModList SEQUENCE (SIZE(1 . . . maxNrofTCI-States)) OF TCI-State OPTIONAL, -- Need N
  tci-StatesToReleaseList SEQUENCE (SIZE(1 . . . maxNrofTCI-States)) OF TCI-StateId OPTIONAL, -- Need N
  vrb-ToPRB-Interleaver ENUMERATED {n2, n4} OPTIONAL,
-- Need S
  resourceAllocation ENUMERATED {resourceAllocationType0, resourceAllocationType1, dynamicSwitch},
  pdsch-TimeDomainAllocationList SetupRelease {PDSCH-TimeDomainResourceAllocationList} OPTIONAL, -- Need M
  pdsch-AggregationFactor ENUMERATED {n2, n4, n8}
OPTIONAL, -- Need S
  rateMatchPatternToAddModList SEQUENCE (SIZE (1 . . . maxNrofRateMatchPatterns)) OF RateMatchPattern OPTIONAL, -- Need N
  rateMatchPatternToReleaseList SEQUENCE (SIZE (1 . . . maxNrofRateMatchPatterns)) OF RateMatchPatternId OPTIONAL, -- Need N
  rateMatchPatternGroup1    RateMatchPatternGroup
    OPTIONAL, --Need R
  rateMatchPatternGroup2    RateMatchPatternGroup
    OPTIONAL, --Need R
  rbg-Size ENUMERATED {config1, config2},
  mcs-Table ENUMERATED {qam256, qam64LowSE}
OPTIONAL, -- Need S
  maxNrofCode WordsScheduledByDCI ENUMERATED {n1, n2}
OPTIONAL, -- Need R
  prb-BundlingType CHOICE {
    staticBundling SEQUENCE {
      bundleSize ENUMERATED {n4, wideband}
OPTIONAL -- Need S
    },
    dynamicBundling SEQUENCE {
      bundleSizeSet1 ENUMERATED {n4, wideband, n2-wideband, n4-wideband} OPTIONAL, -- Need S
      bundleSizeSet2 ENUMERATED {n4, wideband}

OPTIONAL -- Need S
}
},
zp-CSI-RS-ResourceToAddModList SEQUENCE (SIZE
    (1 . . . maxNrofZP-CSI-RS-Resources)) OF ZP-CSI-
    RS-Resource OPTIONAL, -- Need N
  zp-CSI-RS-ResourceToReleaseList   SEQUENCE
    (SIZE (1 . . . maxNrofZP-CSI-RS-Resources)) OF
    ZP-CSI-RS-ResourceId OPTIONAL, -- Need N
  aperiodic-ZP-CSI-RS-ResourceSetsToAddModList
    SEQUENCE (SIZE (1 . . . maxNrofZP-CSI-RS-
    ResourceSets))   OF   ZP-CSI-RS-ResourceSet
    OPTIONAL, -- Need N
  aperiodic-ZP-CSI-RS-ResourceSetsToReleaseList
    SEQUENCE (SIZE (1 . . . maxNrofZP-CSI-RS-
    ResourceSets))   OF   ZP-CSI-RS-ResourceSetId
    OPTIONAL,
-Need N
  sp-ZP-CSI-RS-ResourceSetsToAddModList
    SEQUENCE (SIZE (1 . . . maxNrofZP-CSI-RS-
    ResourceSets))   OF   ZP-CSI-RS-ResourceSet
    OPTIONAL, -- Need N
  sp-ZP-CSI-RS-ResourceSetsToReleaseList
    SEQUENCE (SIZE (1 . . . maxNrofZP-CSI-RS-
    ResourceSets))   OF   ZP-CSI-RS-ResourceSetId
    OPTIONAL, -- Need N
  p-ZP-CSI-RS-ResourceSet SetupRelease {ZP-CSI-RS-
    ResourceSet} OPTIONAL, -- Need M
  . . .
}
RateMatchPatternGroup::=SEQUENCE (SIZE
  (1 . . . maxNrofRateMatchPatternsPerGroup)) OF
  CHOICE {
  cellLevel RateMatchPatternId,
  bwpLevel RateMatchPatternId
}
-- TAG-PDSCH-CONFIG-STOP
-- ASN1STOP
  ServingCellConfigCommon information element:
-- ASN1START
-- TAG-SERVING-CELL-CONFIG-COMMON-START
ServingCellConfigCommon::=SEQUENCE {physCellId
  OPTIONAL, -- Cond
HOAndServCellAdd, downlinkConfigCommon Down-
  linkConfigCommon
OPTIONAL, -- Cond HOAndServCellAdd
  uplinkConfigCommon OPTIONAL, -- Need M
  supplementary UplinkConfig UplinkConfigCommon
OPTIONAL, -- Need S
  n-TimingAdvanceOffset   ENUMERATED   {n0,
    n25600, n39936}
OPTIONAL, -- Need S
  ssb-PositionsInBurst CHOICE {
    shortBitmap BIT STRING (SIZE (4)),
    mediumBitmap BIT STRING (SIZE (8)),
    longBitmap BIT STRING (SIZE (64))
  } OPTIONAL, --Cond AbsFreqSSB
  ssb-periodicityServingCell ENUMERATED {ms5,
    ms10, ms20, ms40,
ms80, ms 160, spare2, spare1} OPTIONAL, -- Need S
  dmrs-TypeA-Position ENUMERATED {pos2, pos3},
  lte-CRS-ToMatchAround SetupRelease {RateMatch-
    PatternLTE-CRS}
OPTIONAL, -- Need M
  rateMatchPatternToAddModList SEQUENCE (SIZE
    (1 . . . maxNrofRateMatchPatterns)) OF RateMatchPat-
    tern OPTIONAL, -- Need N rateMatchPatternToRe-
    leaseList SEQUENCE (SIZE
    (1 . . . maxNrofRateMatchPatterns)) OF RateMatchPat-
    ternId OPTIONAL, -- Need N subcarrierSpacing
    OPTIONAL, -- Cond HOAndServCellAdd
    tdd-UL-DL-ConfigurationCommon   TDD-UL-DL-
      ConfigCommon
OPTIONAL, -- Cond TDD
  ss-PBCH-BlockPower INTEGER (-60 . . . 50),
  . . .
}
-- TAG-SERVING-CELL-CONFIG-COMMON-STOP
-- ASN1STOP Each RateMatchPattern can be defined in one of two following approaches, as described below.

In a first approach, bitmaps are defined including bitmaps 'resourceBlocks', 'symbolsInResourceBlock', and 'periodicityAndPattern'. The first bitmap 'resourceBlocks' defines the rate matching pattern in the frequency domain. When a bit in 'resourceBlocks' is set to 1, the WD may apply rate matching in the corresponding RB in accordance with the 'symbolsInResourceBlock' bitmap. The second bitmap 'symbolsInResourceBlock' defines the rate matching pattern in the time domain across one or two slots. When a bit in 'symbolsInResourceBlock' is set to true, the WD may rate match around the corresponding symbol. The two bitmaps 'resourceBlocks' and 'symbolsInResourceBlock' together define the frequency-time rate matching pattern within one or two slots. Hence, if a RB is included by the first parameter then the symbols as indicated by the second parameters are not available for PDSCH-to-RE mapping. The third bitmap 'periodicity AndPattern' defines a time domain repetition pattern (on a slot-level) at which the frequency-time rate matching pattern defined by 'resourceBlocks' and 'symbolsInResourceBlock' recurs. If the third bitmap 'periodicity AndPattern' is absent, then the frequency-time rate matching pattern defined by 'resourceBlocks' and 'symbolsInResourceBlock' recurs either every slot or every two slots.

In a second approach, an entire control resource set (CORESET) is used as the rate matching pattern such that PDSCH reception is rate matched around the CORESET together with two additional higher layer parameters, given by the search space associated with the CORESET, that defines the OFDM symbols within the slot for the CORESET and the slot-level periodicity. An identifier (ID) of the CORESET to be used as the rate matching pattern for PDSCH is defined by the 'controlResourceSet' parameter in the information element RateMatchPattern.

As part of the PDSCH-Config information element, one or two rate matching groups can be configured via higher layer parameters rateMatchPatternGroup1 and rateMatchPatternGroup2. These group(s) may include a list of RateMatchPattern identifiers and up to 8 RateMatchPattern identifiers can be configured in each group. One or both of these groups can be dynamically indicated for PDSCH resource mapping (i.e., rate matching) via the 'Rate matching indicator' field in DCI format 1_1. When indicated, the included REs are not available for the PDSCH-to-RE mapping for the scheduled PDSCH.

The $1^{st}$ bit (if present) in the 'Rate matching indicator' field is used to indicate rateMatchPatternGroup1, and the 2nd bit (if present) in the 'Rate matching indicator' field is used to indicate rateMatchPatternGroup2.

If rateMatchPatternGroup1 is indicated in DCI, then the union of the RateMatchPatterns indicated via rateMatchPatternGroup1 is used for the purposes of PDSCH resource mapping. That is, any RE that is included in at least one of the RateMatchPatterns in rateMatchPatternGroup1 is declared as unavailable for the PDSCH-to-RE mapping scheduled by the DCI that indicates rateMatchPatternGroup1.

If rateMatchPatternGroup2 is indicated in DCI, then the union of the RateMatchPatterns indicated via rateMatchPatternGroup2 is used for the purposes of PDSCH resource mapping. That is, any RE that is included in at least one of the RateMatchPatterns in rateMatchPatternGroup2 is declared as unavailable for the PDSCH-to-RE mapping scheduled by the downlink control information (DCI) that indicates rateMatchPatternGroup2.

If both rateMatchPatternGroup1 and rateMatchPatternGroup2 are indicated in DCI, then the union of the RateMatchPatterns indicated via both rateMatchPatternGroup1 and rateMatchPatternGroup2 is used for the purposes of PDSCH resource mapping. That is, any RE that is included in at least one of the RateMatchPatterns in either rateMatchPatternGroup1 or rateMatchPatternGroup2 is declared as unavailable for the PDSCH-to-RE mapping scheduled by the DCI that indicates both rateMatchPatternGroup1 and rateMatchPatternGroup2.

If the 'Rate matching indicator' field contains 0 bits (i.e., 'Rate matching indicator' field is absent), neither rateMatchPatternGroup1 nor rateMatchPatternGroup2 is indicated via DCI.

PDSCH Resource Mapping with RE-Level Granularity

In 3GPP Rel-15 NR, one of the ways to configure PDSCH resource mapping with RE-level granularity is to configure Zero-power (ZP) CSI-RS resources to the WDs. As the name implies, the WD may not assume that the network node (e.g., gNB) transmits PDSCH on the REs occupied by the ZP CSI-RS configured to the WD. That is, the PDSCH of the WD may be rate matched around the ZP CSI-RS resources. ZP CSI-RS resources are configured to the WDs for one or more of at least three purposes. Firstly, ZP CSI-RS can be configured to a WD in order to protect non-zero power (NZP) CSI-RS transmissions from one or more neighboring cells. Secondly, ZP CSI-RS can be used for the purposes of indicating whether or not PDSCH is mapped to CSI-Interference Measurement (CSI-IM). Thirdly, (aperiodic) ZP CSI-RS can be used to indicate that the WD can rate match the WD's PDSCH around a (potentially beamformed) NZP CSI-RS intended for the WD or another WD to measure upon. It is mainly for the second and third purposes that the aperiodic ZP CSI-RS field in the DL DCI is comprised.

In a typical use case, the network may not transmit anything on the REs occupied by the CSI-IM. Thus, the WD can measure the inter-cell interference thereon. To indicate that the PDSCH is not mapped to the REs occupied by the CSI-IM, ZP CSI-RS is typically configured to overlap with the CSI-IM. As the CSI-IM and ZP CSI-RS resources typically overlap, the CSI-IM may be colloquially referred to as a ZP CSI-RS-based interference measurement resource (IMR). The IMR can be aperiodic (AP IMR), semi-persistent (SP IMR), or periodic IMR (P IMR). Note that in NR, an NZP CSI-RS can also be configured as an IMR. In Release-15, NR may support aperiodic ZP CSI-RS (AP ZP CSI-RS), semi-persistent ZP CSI-RS (SP ZP CSI-RS) and periodic ZP CSI-RS (P ZP CSI-RS).

Within a BWP, a WD can be configured with one or more ZP CSI-RS resource sets given by higher layer parameter zp-CSI-RS-ResourceToAddModList included in the PDSCH-Config information element. The higher layer parameter zp-CSI-RS-ResourceToAddModList includes one or more ZP-CSI-RS-ResourceSet(s). Each ZP-CSI-RS-ResourceSet can include at most 16 ZP CSI-RS resources.

In 3GPP NR Rel-15, the WD may be configured with higher layer parameter aperiodic-ZP-CSI-RS-ResourceSetsToAddModList including a list of ZP-CSI-RS-ResourceSet(s), which can be triggered aperiodically. The maximum number of ZP-CSI-RS-ResourceSet(s) in this list may be 3, and the number of bits in the DCI field 'ZP CSI-RS trigger' can depend on the exact number of ZP-CSI-RS-ResourceSet(s) in this list. Each non-zero codepoint in the 'ZP CSI-RS trigger' field in DCI is used to trigger one of the ZP-CSI-RS-ResourceSet in aperiodic-ZP-CSI-RS-ResourceSetsToAddModList. The zero codepoint (i.e., the value '0' or '00') of 'ZP CSI-RS trigger' field is used to indicate no aperiodic triggering of ZP CSI-RS. Any RE that is included in the ZP-CSI-RS resources included in the ZP-CSI-RS-ResourceSet indicated by DCI is not available for the PDSCH scheduled by the DCI that indicates ZP-CSI-RS-ResourceSet.

For the PDSCH-to-RE mapping, with RE-level granularity, the parameter lte-CRS-ToMatchAround in ServingCellConfigCommon can be configured to indicate the presence of an LTE reference signal, the common RS. The RE indicated by this parameter is thus not available for PDSCH-to-RE mapping.

Data Transmission over Multiple Transmission Points or Panels

Dynamic Point Selection (DPS)

In NR Release 15, dynamic transmission point selection (DPS) can be supported in which a single transmission point (TRP), can be dynamically selected (e.g., from one PDSCH to a next PDSCH transmitted) for transmitting data to a WD. A different TRP may be selected at different times. In this case, the network node (e.g., gNB) may request the WD to measure and feedback DL CSI for each TRP individually. The network node (e.g., gNB) can compare the measurement feedback reports and then decides which TRP to use for data transmission to the WD. Since the TRPs may be in different physical locations, the propagation channels to the WD can also be different. Different antenna transmit beams may be used in the TRPs and so are different received beams at the WD.

To facilitate receiving PDSCH data from different TRPs, or different beams within the same or different TRP, transmission configuration indicator (TCI) states were introduced in 3GPP NR Rel-15.

A TCI state may include Quasi Co-location (QCL) information between the demodulation reference signal (DMRS) for PDSCH and one or two QCL source DL reference signals, such as CSI-RS, or synchronization signal block (SSB). The supported QCL information types in NR may include one or more of the following:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The WD can use the source QCL reference signals to perform channel analysis such as measuring the Doppler shift and spread, average delay, etc. Having estimates of these parameters before receiving PDSCH DMRS and performing the channel estimation can improve the performance, especially at low signal-to-noise ratio (SNR) and small scheduled bandwidths. The WD may use these parameters to tune the channel estimation algorithm.

Non-coherent Joint Transmission (NC-JT)

NC-JT refers to Multiple-input Multiple-output (MIMO) data transmission over multiple TRPs in which different MIMO layers are transmitted over different TRPs. An example is shown in FIG. 3, where a PDSCH is sent to a WD over two TRPs, each carrying one code word. For example, when the WD has 4 receive antennas while each of the TRPs has only 2 transmit antennas, the WD can support up to 4 MIMO layers. In this case, by transmitting data over two TRPs to the WD, the peak data rate to the WD can be increased as up to 4 aggregated layers from the two TRPs can be used. This is beneficial when the traffic load and thus the resource utilization is low in each TRP because the TRP consumes resources in two TRPs for scheduling one WD. The scheme can also be beneficial in the case where the WD is in line of sight (LOS) of both the TRPs and the rank per TRP (i.e., the maximum number of layers that the WD can receive from one TRP) is limited even when there are more transmit antennas available at each TRP (so that the WD can receive more layers than what one TRP can deliver). A third case when the scheme is beneficial is when the maximum number of layers a TRP can transmit is lower than the number of layers the WD can receive. In this case, utilizing more than one TRP can increase the spectral efficiency of the communication to the WD.

This type of NC-JT may be supported in LTE with two TRPs. For CSI feedback purposes, a WD is configured with a CSI process with two NZP CSI-RS resources, one for each TRP, and one interference measurement resource. For WD complexity reasons, a limitation on at most 8 CSI-RS ports per CSI-RS resource was introduced for this feedback mode; however, each TRP may have more than 8 transmission chains, in which case transmission chains may need to be virtualized down to 8 ports. With two codewords (CWs), either scheduled using a single or two PDSCHs, different modulation coding schemes (MCSs) can be used for the two TRPs. Advanced receiver with code-level interference cancellation (CWIC) can be used at the WD. Furthermore, when one CW is received with error, only that CW needs to be re-transmitted.

An alternative approach (possibly simpler but with less flexibility when it comes to retransmission and link adaptation) is to use a single PDSCH and a single CW over multiple TRPs, an example is shown in FIG. 4, where different layers are transmitted from three TRPs. This allows data transmission over more than 2 TRPs since there is no need to map a CW to a TRP as in the first scheme.

When it comes to CSI reporting with multiple TRPs, the concept of transmission hypothesis can be useful, i.e. what kind of transmission should the CSI report reflect. DPS with two TRPs may be rather simple since there are two transmission hypotheses, but with NC-JT included, and if also considering multiple interference hypotheses, the number of transmission hypotheses can grow quickly with the number of considered TRPs.

To cope with this, in one scenario, the network node (e.g., gNB) may configure a WD with multiple CSI reporting settings, where each report setting is targeting one transmission hypothesis, i.e. some for DPS and the others for NC-JT. The WD then feeds back two CSI reports, one for a DPS hypothesis and the other for an NC-JT hypothesis. The network node (e.g., gNB) can decide whether to use DPS, or NC-JT based on other information available at the network node (e.g., gNB).

Multi-TRP Transmission for Ultra-Reliable Low Latency Communication (URLLC)

In addition to use of multi-TRP transmission for improved data throughput and increased spectral efficiency (as compared to other types of transmissions), another application of multi-TRP transmission is to provide increased reliability of data transmission, in a kind of "TRP diversity" which may be useful particularly in some mission critical applications such as auto driving or industrial control and factory automation. In these applications, the critical requirements are on reliability (e.g., low block error rate (BLER)) and/or latency. In this case, a same data packet may be transmitted over multiple TRPs as shown, for example, in FIG. 5, where the two PDSCHs carry the same data payload encoded with the same (or different) redundancy versions (RVs) so that the WD can perform soft combining of data received from the two PDSCHs.

Either the same or different time/frequency resources may be used for the transmitted PDSCH in different TRPs. When the same time and frequency resource is used in different TRPs, different MIMO layers may be used for the PDSCHs transmitted from different TRPs and a MIMO receiver may be used at the WD to separate the MIMO layers for PDSCH decoding. In this case, each layer/PDSCH may use reference signals that are orthogonal to reference signals used by other transmitted layers/PDSCH in the same resource. In another scenario, different time and frequency resources may be used in different TRPs. The codeword carried by the PDSCHs from different TRPs may have the same or different RV and soft combining may be performed at the WD. For example, Chase combining (CC) can be performed when the same RV is used, while Incremental redundancy (IR)-based soft combining can be performed when different RVs are used.

In another scenario, the same PDSCH may simply be repeated over multiple TRPs in the same resource and with the same DMRS port and the same RV and the composite signal is received by the WD in a single frequency network (SFN) fashion. Hence, in this case, the multiple TRPs are "hidden" from the WD's perspective since the WD only observes a single layer. This typically works in small deployments such as indoor, and at low to medium carrier frequencies.

Single versus Multiple PDCCH

In 3GPP NR Rel-16, both single PDCCH and multiple PDCCH-based solutions for multi-TRP/multi-panel transmissions may be supported.

In the single-PDCCH-based approach, one master TRP may send the PDCCH to the WD to schedule PDSCH from multiple TRPs (for example, different codewords transmissions from multiple TRPs or different layers of a codeword from multiple TRPs). The single PDCCH approach may have one or more of the following benefits:

Suitable for ideal backhaul cases, where one master TRP has the scheduler and handles control signaling.

Simple specification impact for uplink (UL), since a single PUCCH may be reused.

A single PDCCH approach may have one or more of the following drawbacks:

Not suitable for outdoor macros where it is more likely that different TRPs may be different cells and thus each TRP has its own scheduler serving "non-multi-TRP" traffic as well.

No PDCCH diversity, i.e., may not extend well to Ultra-Reliable Low Latency Communication (URLLC) use cases.

In the multiple-PDDCH-based approach, multiple TRPs may send PDCCHs to the WD. The PDCCHs can either carry different DCI messages, or the same DCI message (i.e., DCI repetition or PDCCH diversity). The multiple PDCCH approach may have one or more of the following benefits:

It can serve both ideal and non-ideal backhaul deployments.

It can be used both in outdoor macros scenarios as well as indoor.

Specification impact is small, e.g., DCI, codeword to layer mapping and QCL solutions from Rel.15 can be reused.

The use of multi-PDCCH also serves URLLC use cases well as it can provide a solution for DCI repetition.

A drawback with multi-PDCCH may be that the WD complexity increases for PDCCH detection, which may increase the error probability and the PDCCH overhead may be increased. It should be noted that with the multi-PDCCH approach, a WD can receive two downlink-related DCIs scheduling PDSCH data in the same slot where the two DCIs are transmitted in PDCCHs received from different TRPs.

Configured Grant

In NR, dynamic scheduling is supported, but there is also a possibility to configure semi-persistent scheduling in the downlink, where a periodicity of PDSCH transmission is configured by RRC and then the start and stop of such transmission is controlled by DCI, i.e., with a PDCCH. Hence, control signaling may be used only once, which reduces the control signaling overhead.

In uplink, there may be a similar feature, using configured grants (CG). Here, CG type 2 is similar to the semi-persistent scheduling in downlink (using RRC to configure resources plus DCI to start and stop the PUSCH transmissions) while CG type 1 is all controlled by RRC, even the start and stop of the PUSCH transmission. Thus, existing systems are lacking in their multi-PDCCH approach.

SUMMARY

Some embodiments advantageously provide methods and apparatuses for handling multiple PDCCHs for multi-TRP.

In one embodiment, a network node configured to communicate with a wireless device (WD) is provided. The network node is configured to, and/or comprising a radio interface and/or comprising processing circuitry configured to cause the network node to cause/perform one or more of: transmit multiple physical downlink control channels (PDCCHs) within a time-frequency resource, the multiple PDCCHs including physical downlink shared channel (PDSCH) resource mapping information for mapping resources of one or more PDSCHs; and schedule and communicate the one or more PDSCHs according to the PDSCH resource mapping information included in the multiple PDCCHs.

In another embodiment, a method implemented in a network node is provided. The method includes one or more of transmitting multiple PDCCHs within a time-frequency resource, the multiple PDCCHs including PDSCH resource mapping information for mapping resources of one or more PDSCHs; and scheduling and transmitting the one or more PDSCHs according to the PDSCH resource mapping information included in the multiple PDCCHs.

In yet another embodiment, a wireless device (WD) configured to communicate with a network node is provided. The WD is configured to, and/or comprises a radio interface and/or processing circuitry configured to cause/perform one or more of: receive multiple PDCCHs within a time-frequency resource, each of the multiple PDCCHs scheduling one or more PDSCHs; and perform PDSCH resource mapping for each of the one or more PDSCHs based on the received multiple PDCCHs.

In yet another embodiment, a method implemented in a wireless device (WD) is provided. The method includes one or more of receiving multiple PDCCHs within a time-frequency resource, each of the multiple PDCCHs scheduling one or more PDSCHs; and performing PDSCH resource mapping for each of the one or more PDSCHs based on the received multiple PDCCHs.

According to one aspect of the disclosure, a wireless device is provided. The wireless device includes processing circuitry (84) configured to receive a plurality of physical downlink control channel, PDCCH, transmissions where the plurality of PDCCH transmissions includes a plurality of downlink control information, DCI, messages scheduling a plurality of physical downlink shared channel, PDSCH, transmissions, and where at least two of the plurality of PDSCH transmissions one of partially and fully overlap in a time domain. The processing circuitry is further configured to perform PDSCH resource mapping for decoding the plurality of PDSCH transmissions based at least in part on the plurality of DCI messages.

According to one or more embodiments of this aspect, each of the plurality of DCI messages is detected within a respective control resource set, CORESET, of a plurality of CORESETs where each CORESET is associated with a CORESET group identifier and at least one common reference signal, CRS, pattern. The PDSCH resource mapping is based at least in part on the CRS patterns. According to one or more embodiments of this aspect, each of the plurality of CORESETs are associated with a corresponding CRS parameter indicating the at least one CRS pattern. According to one or more embodiments of this aspect, the PDSCH resource mapping is based at least in part on a union of the CRS patterns associated with the CORESET group identifier of the CORESET in which the DCI scheduling the PDSCH is detected.

According to one or more embodiments of this aspect, each CRS pattern indicates resources that are unavailable for PDSCH to resource element mapping. According to one or more embodiments of this aspect, a plurality of common reference signal, CRS, patterns for the PDSCH resource mapping are configured where the PDSCH resource mapping is performed based at least in part on a union of the configured plurality of CRS patterns when the plurality of DCI messages are detected at the wireless device. According to one or more embodiments of this aspect, each of the plurality of DCI messages indicates a resource element, RE, level PDSCH resource mapping information where the PDSCH resource mapping is performed based at least in part on the RE-level PDSCH resource mapping information indicated by each of the plurality of DCI messages.

According to one or more embodiments of this aspect, each of the plurality of DCI messages indicates at least one zero power channel state information-reference signal, ZP CSI-RS, resource for PDSCH resource mapping where the PDSCH resource mapping for each of the plurality of PDSCHs is based at least in part on the at least one zero power channel state information-reference signal, ZP CSI-RS, resource is indicated by the respective DCI scheduling each PDSCH. According to one or more embodiments of this aspect, at least one zero power channel state information-reference signal, ZP CSI-RS, resource is indicated via a ZP CSI-RS trigger. According to one or more embodiments of this aspect, the plurality of PDCCH transmissions are received within a communication slot. According to one or more embodiments of this aspect, each of the plurality of PDCCH transmissions are associated with a respective network node.

According to another aspect of the disclosure, a method implemented by a wireless device is provided. A plurality of scheduled physical downlink control channel, PDCCH, transmissions are received. The plurality of PDCCH transmissions includes a plurality of downlink control information, DCI, messages scheduling a plurality of physical downlink shared channel, PDSCH, transmissions where at least two of the plurality of PDSCH transmissions one of partially and fully overlap in a time domain. PDSCH resource mapping for decoding the plurality of PDSCH transmissions is performed based at least in part on the plurality of DCI messages.

According to one or more embodiments of this aspect, each of the plurality of DCI messages is detected within a respective control resource set, CORESET, of a plurality of CORESETs where each CORESET is associated with a CORESET group identifier and at least one common reference signal, CRS, pattern. The PDSCH resource mapping is based at least in part on the CRS patterns. According to one or more embodiments of this aspect, each of the plurality of CORESETs are associated with a corresponding CRS parameter indicating the at least one CRS pattern. According to one or more embodiments of this aspect, the PDSCH resource mapping is based at least in part on a union of the CRS patterns associated with the CORESET group identifier of the CORESET in which the DCI scheduling the PDSCH is detected.

According to one or more embodiments of this aspect, each CRS pattern indicates resources that are unavailable for PDSCH to resource element mapping. According to one or more embodiments of this aspect, a plurality of common reference signal, CRS, patterns for the PDSCH resource mapping are configured where the PDSCH resource mapping is performed based at least in part on a union of the configured plurality of CRS patterns when the plurality of DCI messages are detected at the wireless device. According to one or more embodiments of this aspect, each of the plurality of DCI messages indicates a resource element, RE, level PDSCH resource mapping information where the PDSCH resource mapping is performed based at least in part on the RE-level PDSCH resource mapping information indicated by each of the plurality of DCI messages.

According to one or more embodiments of this aspect, each of the plurality of DCI messages indicates at least one zero power channel state information-reference signal, ZP CSI-RS, resource for PDSCH resource mapping where the PDSCH resource mapping for each of the plurality of PDSCHs is based at least in part on the at least one ZP CSI-RS resource indicated by the respective DCI scheduling each PDSCH. According to one or more embodiments of this aspect, at least one ZP CSI-RS resource is indicated via a ZP CSI-RS trigger. According to one or more embodiments of this aspect, the plurality of PDCCH transmissions are received within a communication slot. According to one or more embodiments of this aspect, each of the plurality of PDCCH transmissions are associated with a respective network node.

According to another aspect of the disclosure, a system is provided. The system includes a plurality of network nodes configured to communicate with a wireless device. Each of the plurality of network nodes includes processing circuitry configured to cause a physical downlink control channel, PDCCH, transmission where the PDCCH transmission includes a downlink control information, DCI, message scheduling a physical downlink shared channel, PDSCH, transmission. The processing circuitry is further configured to cause the PDSCH transmission for decoding by the wireless device using at least in part PDSCH resource mapping based at least in part on the DCI messages from the plurality of network nodes. At least two of the scheduled PDSCH transmissions one of partially and fully overlap in a time domain.

According to one or more embodiments of this aspect, each DCI message is transmitted within a respective control resource set, CORESET, of a plurality of CORESETs where each CORESET is associated with a CORESET group identifier and at least one common reference signal, CRS, pattern. The PDSCH resource mapping is based at least in part on the CRS patterns. According to one or more embodiments of this aspect, each of the plurality of CORESETs are associated with a CRS parameter indicating the at least one CRS pattern. According to one or more embodiments of this aspect, the PDSCH resource mapping is based at least in part on a union of the CSI patterns associated with the CORESET group identifier of the CORESET in which the DCI scheduling the PDSCH is detected.

According to one or more embodiments of this aspect, each CRS pattern indicates resources that are unavailable for PDSCH to resource element mapping. According to one or more embodiments of this aspect, a plurality of common reference signal, CRS, patterns for PDSCH resource mapping are configured where the PDSCH resource mapping is based at least in part on a union of the configured plurality of CRS patterns when the plurality of DCI messages are detected at the wireless device. According to one or more embodiments of this aspect, each of the DCI messages indicates a resource element, RE, level PDSCH resource mapping information where the PDSCH resource mapping is based at least in part on the RE-level PDSCH resource mapping information indicated by each of the DCI messages According to one or more embodiments of this aspect, each of the DCI messages indicates at least one ZP CSI-RS resources for PDSCH resource mapping where the PDSCH resource mapping for each PDSCH is based at least in part on the at least one ZP CSI-RS resource indicated by the respective DCI scheduling each PDSCH. According to one or more embodiments of this aspect, at least one ZP CSI-RS resource is indicated via a ZP CSI-RS trigger. According to one or more embodiments of this aspect, the PDCCH transmissions are received within a communication slot. According to one or more embodiments of this aspect, each network node corresponds to a respective network node.

According to another aspect of the disclosure, a method implemented by a system is provided. At each of a plurality of network nodes, cause a physical downlink control channel, PDCCH, transmission. The PDCCH transmission includes a downlink control information, DCI, message scheduling a physical downlink shared channel, PDSCH, transmission. At each of the plurality of network nodes, the PDSCH transmission is caused for decoding by the wireless device using at least in part PDSCH resource mapping based at least in part on the DCI messages from the plurality of network nodes. At least two of the scheduled PDSCH transmissions one of partially and fully overlap in a time domain.

According to one or more embodiments of this aspect, each DCI message is transmitted within a respective control resource set, CORESET, of a plurality of CORESETs where each CORESET is associated with a CORESET group identifier and at least one common reference signal, CRS, pattern. The PDSCH resource mapping is based at least in part on the CRS patterns. According to one or more embodiments of this aspect, each of the plurality of CORESETs are associated with a CRS parameter indicating the at least one CRS pattern. According to one or more embodiments of this aspect, the PDSCH resource mapping is based at least in part on a union of the CSI patterns associated with the CORESET group identifier of the CORESET in which the DCI scheduling the PDSCH is detected.

According to one or more embodiments of this aspect, each CRS pattern indicates resources that are unavailable for PDSCH to resource element mapping. According to one or more embodiments of this aspect, a plurality of common reference signal, CRS, patterns for PDSCH resource mapping are configured where the PDSCH resource mapping is based at least in part on a union of the configured plurality of CRS patterns when the plurality of DCI messages are detected at the wireless device. According to one or more embodiments of this aspect, each of the DCI messages indicates a resource element, RE, level PDSCH resource mapping information where the PDSCH resource mapping is based at least in part on the RE-level PDSCH resource mapping information indicated by each of the DCI messages.

According to one or more embodiments of this aspect, each of the DCI messages indicates at least one zero power channel state information-reference signal, ZP CSI-RS, resource for PDSCH resource mapping where the PDSCH resource mapping for each PDSCH is based at least in part on the at least one ZP CSI-RS resource indicated by the respective DCI scheduling each PDSCH. According to one or more embodiments of this aspect, at least one ZP CSI-RS resource is indicated via a ZP CSI-RS trigger. According to one or more embodiments of this aspect, the PDCCH transmissions are received within a communication slot. According to one or more embodiments of this aspect, each network node corresponds to a respective network node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 8 is a flowchart illustrating exemplary methods implemented in a communication system including a host computer, a network node and a wireless device for executing a client application at a wireless device according to some embodiments of the present disclosure;

FIG. 9 is a flowchart illustrating exemplary methods implemented in a communication system including a host computer, a network node and a wireless device for receiving user data at a wireless device according to some embodiments of the present disclosure;

DETAILED DESCRIPTION

Figure 1:
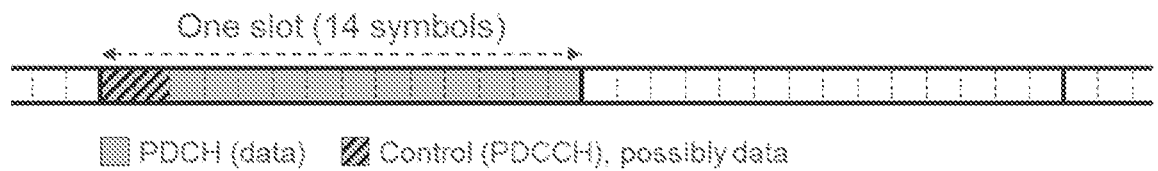
FIG. 1 illustrates an example of NR time-domain structure with 15 kHz subcarrier spacing.
Figure 2:
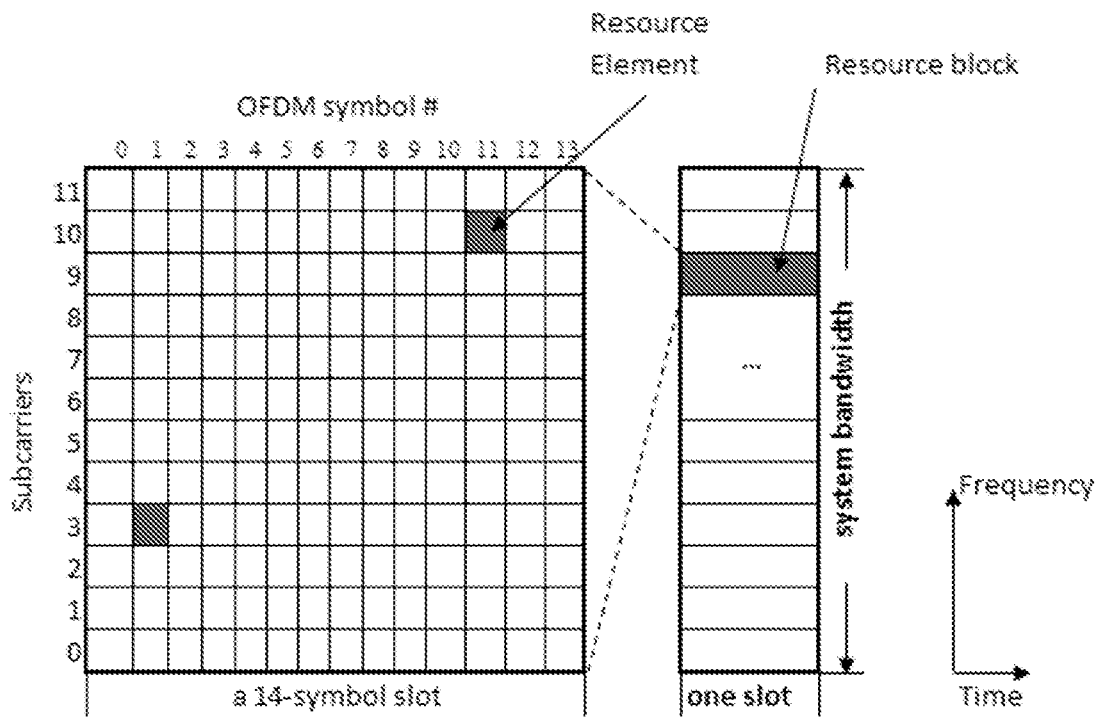
FIG. 2 illustrates an example of NR physical resource grid.
Figure 3:
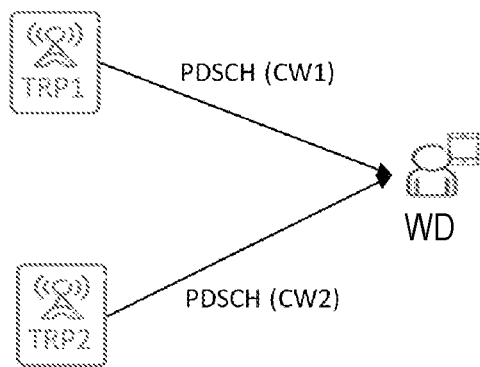
FIG. 3 illustrates an example of NC-JT.
Figure 4:
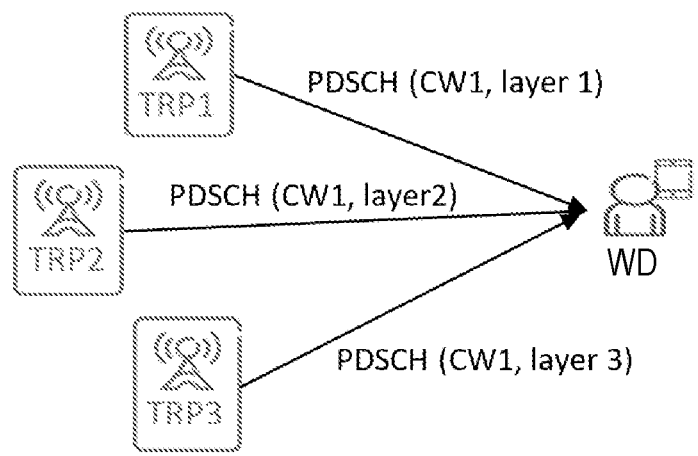
FIG. 4 illustrates an example of transmit a single CW over multiple TRPs.

In the multiple PDCCH approach, the WD may in some slots receive multiple PDCCHs scheduling PDSCHs that overlaps fully, or partially in the time domain from multiple TRPs or multiple panels belonging to the same TRP in a single slot.

The multiple PDCCHs may thus indicate different PDSCH resource mapping information. Current solutions do not adequately address how the WD should perform PDSCH resource mapping (i.e., PDSCH rate matching) in multiple PDCCH cases, because e.g., the 3GPP NR Rel-15 only specifies receiving a single PDCCH scheduling single PDSCH at the same time. Thus, some embodiments of this disclosure provide techniques for PDSCH resource mapping with multiple PDCCHs.

In embodiment one, the WD procedures for PDSCH resource mapping with RB symbol-level granularity when receiving multiple PDCCH within the same slot are provided. In some variants of embodiment one, the WD performs PDSCH resource mapping by taking into account the RB and symbol-level PDSCH resource mapping information indicated in all the received DCI messages from the multiple PDCCHs that the WD received in a slot. In some other variants of embodiment one, restrictions on which PDCCH has the possibility to impact the rate matching of a PDSCH is introduced. This implies that the WD can proceed to decode a PDSCH after PDCCH candidates that have the possibility to impact the rate matching of the PDSCH in the slot (or other time duration) have been found. In yet another variant, rate matching indication for a PDSCH is self-contained, and only depends on the scheduling PDCCH.

In embodiment two, WD procedures for PDSCH resource mapping with RE-level granularity when receiving multiple PDCCH within the same slot are provided. In some aspects, this may be an extension of embodiment one. A further embodiment on how to handle rate matching around possible LTE common reference signals (CRSs) that may be transmitted from multiple TRPs is also provided.

In embodiment three, WD procedures for PDSCH resource mapping when receiving multiple PDCCHs within the same slot and when the PDSCHs are partially overlapping in time-domain are provided.

In embodiment four, some embodiments related to rate matching around NZP CSI-RS from one or more TRPs are provided.

One benefit of the proposed solution in this disclosure may be that some embodiments define the WD procedure on how to perform PDSCH resource mapping, thus eliminating ambiguity at the WD, when the WD receives multiple PDCCHs that may indicate different PDSCH resource mapping information. Other benefits of more specific embodiments are discussed in more detail below.

Before describing in detail exemplary embodiments, it is noted that the embodiments reside primarily in combinations of apparatus components and processing steps related to PDSCH resource mapping for multi-TRP. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom." and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising." "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD. Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device, etc.

In some embodiments, a TRP may be associated with a network node. In some embodiments, a multi-trp may include more than one TRPs associated with one or more network nodes.

In some embodiments, the term "slot" is used to indicate a radio resource; however, it should be understood that the techniques described herein may advantageously be used with other types of radio resources, such as any type of physical resource or radio resource expressed in terms of length of time. Examples of time resources are: symbol, time slot, minislot, subframe, radio frame, transmission time interval (TTI), interleaving time, a time resource number, etc.

In some embodiments, a transmitter (e.g., network node) and a receiver (e.g., WD) previously agrees on rule(s) for determining for which resources the transmitter and receiver will arrange one or more physical channels during transmission of the resources, and this rule may, in some embodiments, be referred to as 'mapping'. In other embodiments, the term "mapping" may have other meanings.

Although the description herein may be explained in the context of a downlink (DL) channel (e.g., PDSCH), it should be understood that the principles may also be applicable to other channels, such as, for example, other DL channels, or even some uplink channels (e.g., PUSCH).

Receiving (or obtaining) control information may comprise receiving one or more control information messages (e.g., DCI). It may be considered that receiving control signaling comprises demodulating and/or decoding and/or detecting, e.g. blind detection of, one or more messages, in particular a message carried by the control signaling, e.g. based on an assumed set of resources, which may be searched and/or listened for the control information. It may be assumed that both sides of the communication are aware of the configurations, and may determine the set of resources, e.g. based on the reference size.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel (e.g., PDSCH), in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 6:
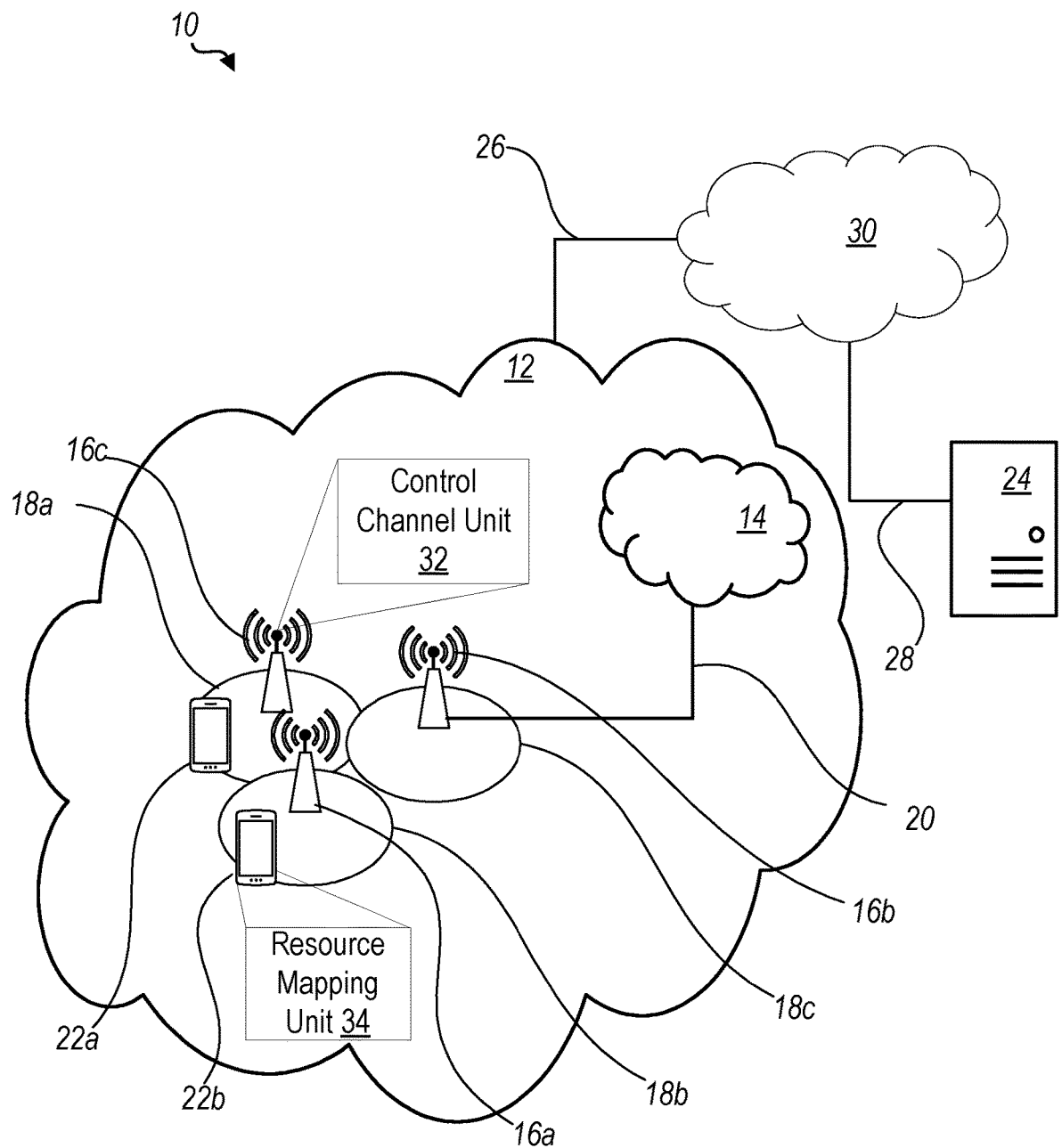
FIG. 6 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 6 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 6 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a control channel unit 32 which is configured to cause the network node 16 to cause/perform one or more of, optionally, transmit multiple physical downlink control channels (PDCCHs) within a time-frequency resource, the multiple PDCCHs including physical downlink shared channel (PDSCH) resource mapping information for mapping resources of one or more PDSCHs; and schedule and communicate the one or more PDSCHs according to the PDSCH resource mapping information included in the multiple PDCCHs.

A wireless device 22 is configured to include a resource mapping unit 34 which is configured to cause/perform one or more of, optionally, receive multiple PDCCHs within a time-frequency resource, each of the multiple PDCCHs scheduling one or more PDSCHs; and perform PDSCH resource mapping for each of the one or more PDSCHs based on the received multiple PDCCHs.

Example implementations, in accordance with an embodiment, of the WD 22, network node 16 and host computer 24 discussed in the preceding paragraphs will now be described with reference to FIG. 7. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include control channel unit 32 configured to cause the network node 16 to cause/perform one or more of, optionally, transmit, such as via radio interface 62, multiple physical downlink control channels (PDCCHs) within a time-frequency resource, the multiple PDCCHs including physical downlink shared channel (PDSCH) resource mapping information for mapping resources of one or more PDSCHs; and schedule and transmit, such as via radio interface 62, the one or more PDSCHs according to the PDSCH resource mapping information included in the multiple PDCCHs.

In some embodiments, the processing circuitry 68 and/or the control channel unit 32 is further configured to cause the network node 16 to transmit, such as via radio interface 62, each of the one or more PDSCHs at least partially overlapping in the time domain. The processing circuitry 68 and/or the control channel unit 32 is configured to transmit, such as via radio interface 62, each of the one or more PDSCHs with one of a common set of PDSCH resource mapping patterns and different sets of PDSCH resource mapping patterns. In some embodiments, the PDSCH resource mapping information is included in all or a subset of downlink control information (DCI) messages in the multiple PDCCHs. In some embodiments, each of the PDCCHs transmitted within the time-frequency resource is transmitted, such as via radio interface 62, in a different control resource set (CORESET) and each CORESET is associated with an active transmission configuration indicator (TCI) state. In some embodiments, each CORESET with an active TCI state corresponds to one of a transmission point (TRP) and a panel, the one of the TRP and the panel transmitting the corresponding PDCCH. In some embodiments, the PDSCH resource mapping information is indicated in at least one downlink control information (DCI) message within the transmitted multiple PDCCHs.

In some embodiments, the PDSCH resource mapping information indicated in the at least one DCI message includes at least one of a rate matching indicator field and a zero power (ZP) channel state information-reference signal (CSI-RS) trigger field. In some embodiments, the PDSCH resource mapping information indicated by the at least one DCI message is configured via radio resource control (RRC) signaling. In some embodiments, the time-frequency resource corresponds to at least one of a slot and a set of CORESETs. In some embodiments, the PDSCH resource mapping information includes a PDSCH resource mapping pattern indicated in at least one downlink control information (DCI) message carried by a corresponding PDCCH. In some embodiments, the PDSCH resource mapping information included in downlink control information (DCI) messages in the transmitted multiple PDCCHs includes a joint pattern, the joint pattern being a union of PDSCH resource mapping patterns indicated in the DCI messages. In some embodiments, the PDSCH resource mapping information includes one or more of an indication of a first PDSCH resource mapping pattern to be applied by the WD 22 in PDSCHs in a first time region; and an indication of a second PDSCH resource mapping pattern to be applied by the WD 22 in PDSCHs in a second time region, the first time region associated with overlapping PDSCHs and the second time region associated with non-overlapping PDSCHs. In some embodiments, the PDSCH resource mapping information indicates rate matching around non-zero power (NZP CSI-RS) resources indicated by an active transmission configuration indicator (TCI) state.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a resource mapping unit 34 configured to cause/perform one or more of: optionally receive, such as via radio interface 82, multiple PDCCHs within a time-frequency resource, each of the multiple PDCCHs scheduling one or more PDSCHs; and perform PDSCH resource mapping for each of the one or more PDSCHs based on the received multiple PDCCHs.

In some embodiments, the processing circuitry 84 and/or resource mapping unit 34 is further configured to cause/perform one or more of receive, such as via radio interface 82, each of the one or more PDSCHs at least partially overlapping in the time domain; and receive, such as via radio interface 82, each of the one or more PDSCHs with one of a common set of PDSCH resource mapping patterns and different sets of PDSCH resource mapping patterns. In some embodiments, the performance of the PDSCH resource mapping is based on all or a subset of downlink control information (DCI) messages in the received PDCCHs. In some embodiments, each of the PDCCHs received within the time-frequency resource is received in a different control resource set (CORESET) and each CORESET is associated with an active transmission configuration indicator (TCI) state. In some embodiments, each CORESET with an active TCI state corresponds to one of a transmission point (TRP) and a panel, the one of the TRP and the panel transmitting the corresponding PDCCH. In some embodiments, the performance of the PDSCH resource mapping is based on PDSCH resource mapping information indicated in at least one downlink control information (DCI) message from the received multiple PDCCHs.

In some embodiments, the PDSCH resource mapping information indicated in the at least one DCI message includes at least one of a rate matching indicator field and a zero power (ZP) channel state information-reference signal (CSI-RS) trigger field. In some embodiments, the PDSCH resource mapping information indicated by the at least one DCI message is configured via radio resource control (RRC) signaling. In some embodiments, the time-frequency resource corresponds to at least one of a slot and a set of CORESETs. In some embodiments, the processing circuitry 84 and/or resource mapping unit 34 is configured to perform the PDSCH resource mapping for each of the one or more PDSCHs based on the received multiple PDCCHs by being further configured to cause/perform one or more of: identify at least one downlink control information (DCI) message from the received multiple PDCCHs; and apply a PDSCH resource mapping pattern indicated in the at least one DCI message to the PDSCH corresponding to the PDCCH carrying the DCI message. In some embodiments, the processing circuitry 84 and/or resource mapping unit 34 is configured to perform the PDSCH resource mapping for each of the one or more PDSCHs based on the received multiple PDCCHs by being further configured to cause/perform one or more of: identify the downlink control information (DCI) messages from the received multiple PDCCHs; and apply a joint pattern to the PDSCHs corresponding to the DCI messages, the joint pattern being a union of PDSCH resource mapping patterns indicated in the DCI messages.

In some embodiments, the processing circuitry 84 and/or resource mapping unit 34 is configured to perform the PDSCH resource mapping for each of the one or more PDSCHs based on the received multiple PDCCHs by being further configured to cause/perform one or more of: apply a first PDSCH resource mapping pattern to PDSCHs in a first time region; and apply a second PDSCH resource mapping pattern to PDSCHs in a second time region, the first time region associated with overlapping PDSCHs and the second time region associated with non-overlapping PDSCHs. In some embodiments, the PDSCH resource mapping includes rate matching around non-zero power (NZP CSI-RS) resources indicated by an active transmission configuration indicator (TCI) state.

Figure 7:
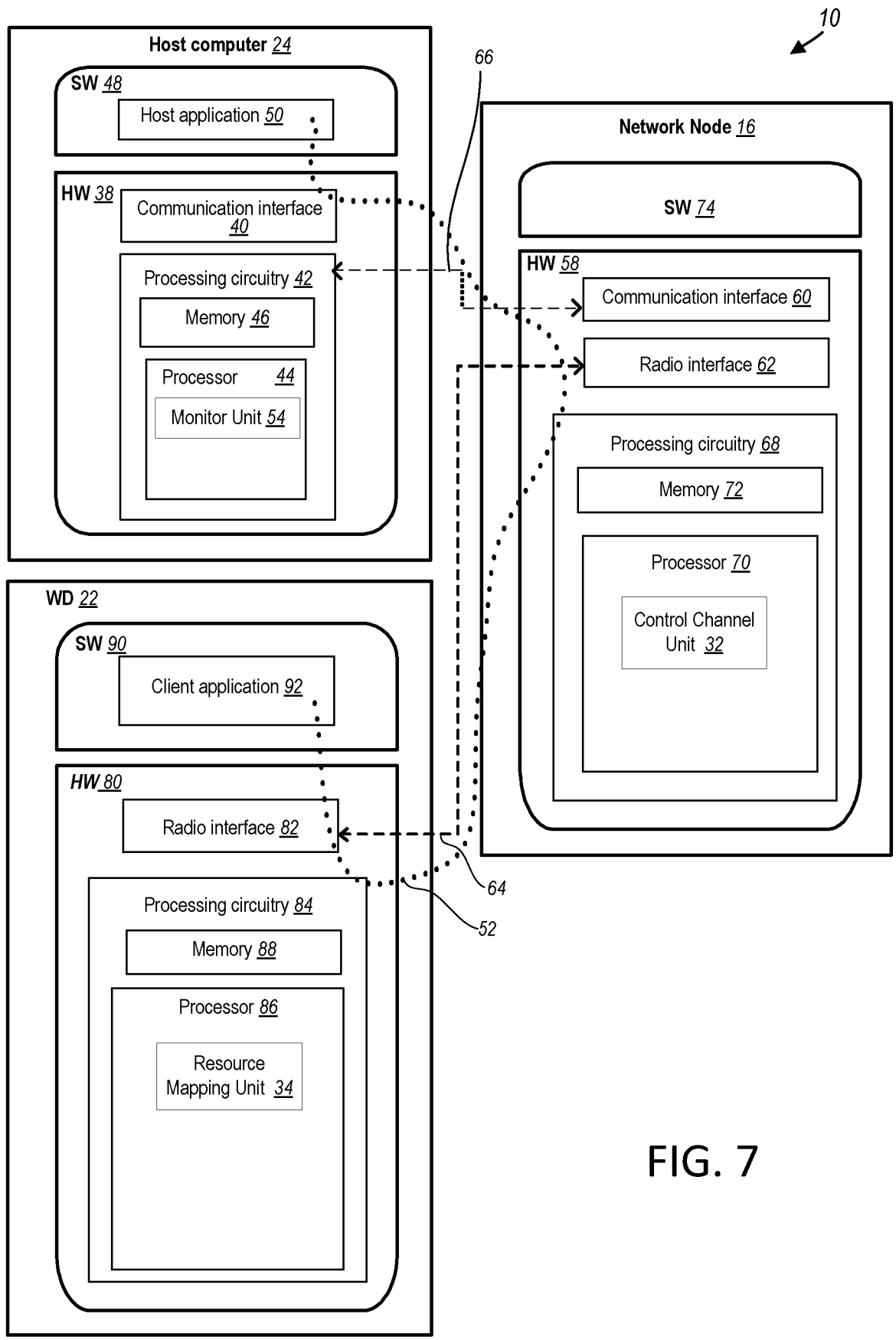
FIG. 7 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 7 and independently, the surrounding network topology may be that of FIG. 6.

In FIG. 7, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 6 and 7 show various "units" such as control channel unit 32, and resource mapping unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 8 is a flowchart illustrating an exemplary method implemented in a communication system, such as, for example, the communication system of FIGS. 6 and 7, in accordance with one embodiment. The communication system may include a host computer 24, a network node 16 and a WD 22, which may be those described with reference to FIG. 7. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 114, associated with the host application 50 executed by the host computer 24 (Block S108).

FIG. 9 is a flowchart illustrating an exemplary method implemented in a communication system, such as, for example, the communication system of FIG. 6, in accordance with one embodiment. The communication system may include a host computer 24, a network node 16 and a WD 22, which may be those described with reference to FIGS. 6 and 7. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 10:
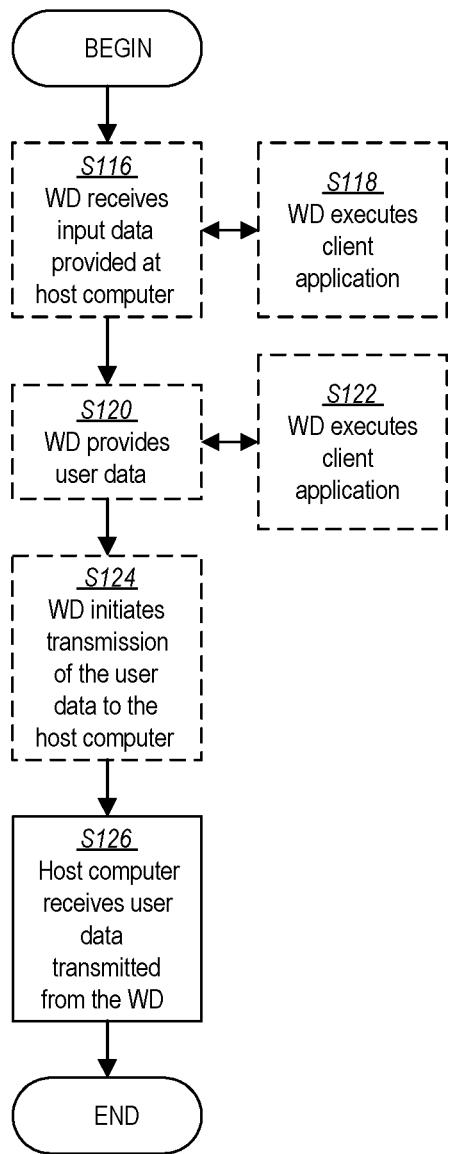
FIG. 10 is a flowchart illustrating exemplary methods implemented in a communication system including a host computer, a network node and a wireless device for receiving user data from the wireless device at a host computer according to some embodiments of the present disclosure.

FIG. 10 is a flowchart illustrating an exemplary method implemented in a communication system, such as, for example, the communication system of FIG. 6, in accordance with one embodiment. The communication system may include a host computer 24, a network node 16 and a WD 22, which may be those described with reference to FIGS. 6 and 7. In an optional first step of the method, the WD 22 receives input data provided by the host computer 24 (Block S116). In an optional substep of the first step, the WD 22 executes the client application 114, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 114 (Block S122). In providing the user data, the executed client application 114 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 5:
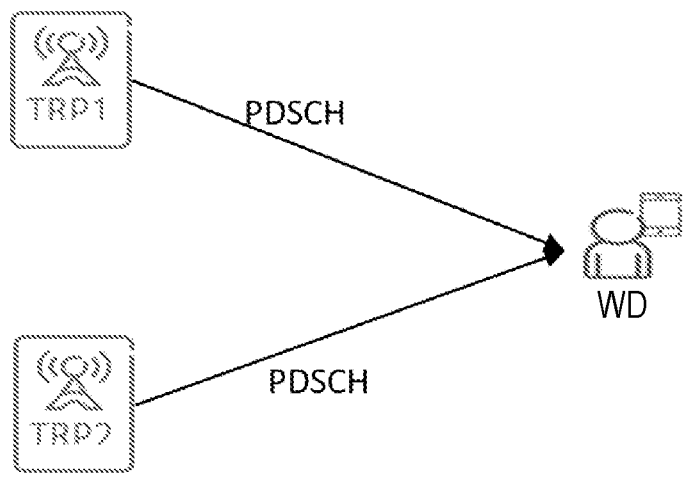
FIG. 5 illustrates an example of data transmission over multiple TRPs for increased reliability.
Figure 11:
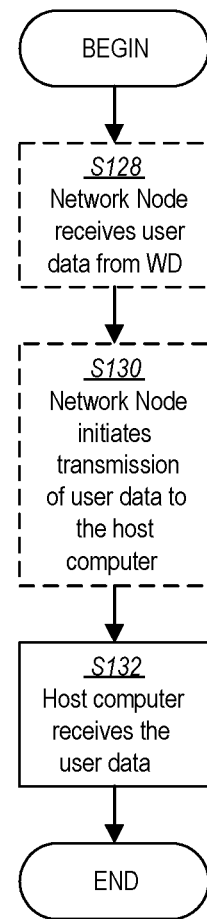
FIG. 11 is a flowchart illustrating exemplary methods implemented in a communication system including a host computer, a network node and a wireless device for receiving user data at a host computer according to some embodiments of the present disclosure.

FIG. 11 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 6 and 7. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 12:
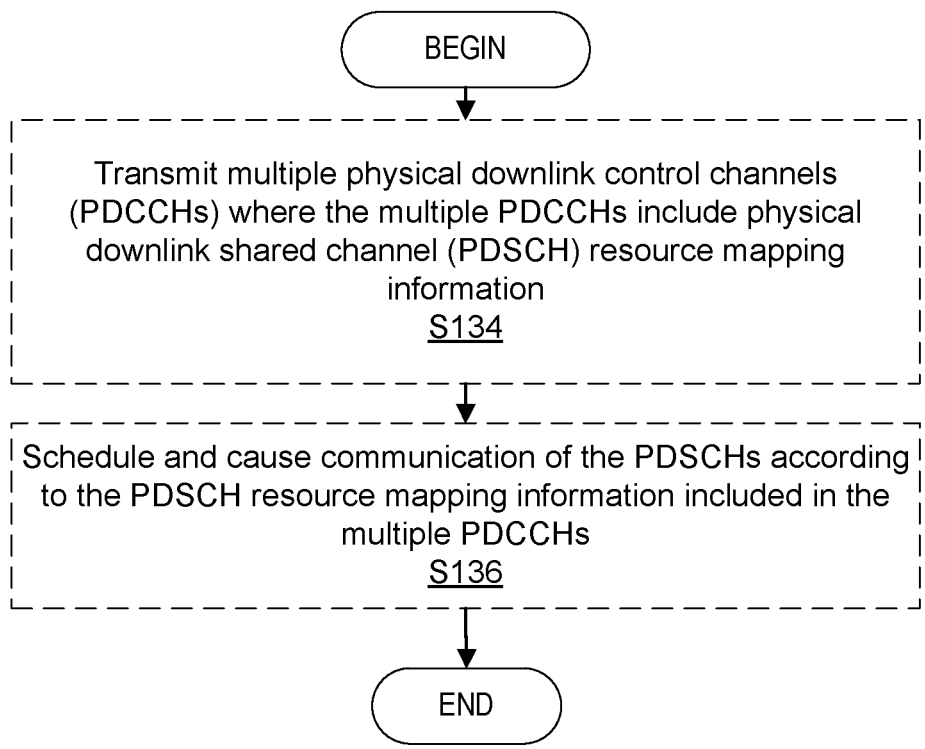
FIG. 12 is a flowchart of an exemplary process in a network node for control channel unit according to some embodiments of the present disclosure.

FIG. 12 is a flowchart of an exemplary process in a network node 16 for configuring PDSCH resource mapping with multi-PDCCH. One or more Blocks and/or functions and/or methods performed by the network node 16 may be performed by one or more elements of network node 16 such as by control channel unit 32 in processing circuitry 68, processor 70, radio interface 62, etc., according to the example method. The example method includes optionally, one or more of transmitting (block S134), such as via radio interface 62, multiple PDCCHs where the multiple PDCCHs include PDSCH resource mapping information; and scheduling and causing transmission of (block S136), such as via control channel unit 32 in processing circuitry 68, processor 70, radio interface 62, the PDSCHs according to the PDSCH resource mapping information included in the multiple PDCCHs. In some embodiments, the method further includes one or more of transmitting, such as via radio interface 62, each of the PDSCHs at least partially overlapping in the time domain; and transmitting, such as via radio interface 62, each of the PDSCHs with one of a common set of PDSCH resource mapping patterns and different sets of PDSCH resource mapping patterns. In some embodiments, the PDSCH resource mapping information is included in all or a subset of downlink control information (DCI) messages in the multiple PDCCHs. In some embodiments, each of the PDCCHs transmitted within a time-frequency resource is transmitted in a different control resource set (CORESET) and each CORESET is associated with an active transmission configuration indicator (TCI) state. In some embodiments, each CORESET with an active TCI state corresponds to one of a transmission point (TRP) and a panel, the one of the TRP and the panel transmitting the corresponding PDCCH. In some embodiments, the PDSCH resource mapping information is indicated in at least one downlink control information (DCI) message within the transmitted multiple PDCCHs. In some embodiments, the PDSCH resource mapping information indicated in the at least one DCI message includes at least one of a rate matching indicator field and a zero power (ZP) channel state information-reference signal (CSI-RS) trigger field. In some embodiments, the PDSCH resource mapping information indicated by the at least one DCI message is configured via radio resource control (RRC) signaling. In some embodiments, the time-frequency resource corresponds to at least one of a slot and a set of CORESETs.

In some embodiments, the PDSCH resource mapping information includes a PDSCH resource mapping pattern indicated in at least one downlink control information (DCI) message carried by a corresponding PDCCH. In some embodiments, the PDSCH resource mapping information included in downlink control information (DCI) messages in the transmitted multiple PDCCHs includes a joint pattern, the joint pattern being a union of PDSCH resource mapping patterns indicated in the DCI messages. In some embodiments, the PDSCH resource mapping information includes one or more of an indication of a first PDSCH resource mapping pattern to be applied by the WD in PDSCHs in a first time region; and an indication of a second PDSCH resource mapping pattern to be applied by the WD in PDSCHs in a second time region, the first time region associated with overlapping PDSCHs and the second time region associated with non-overlapping PDSCHs. In some embodiments, the PDSCH resource mapping information indicates rate matching around non-zero power (NZP CSI-RS) resources indicated by an active transmission configuration indicator (TCI) state.

Figure 13:
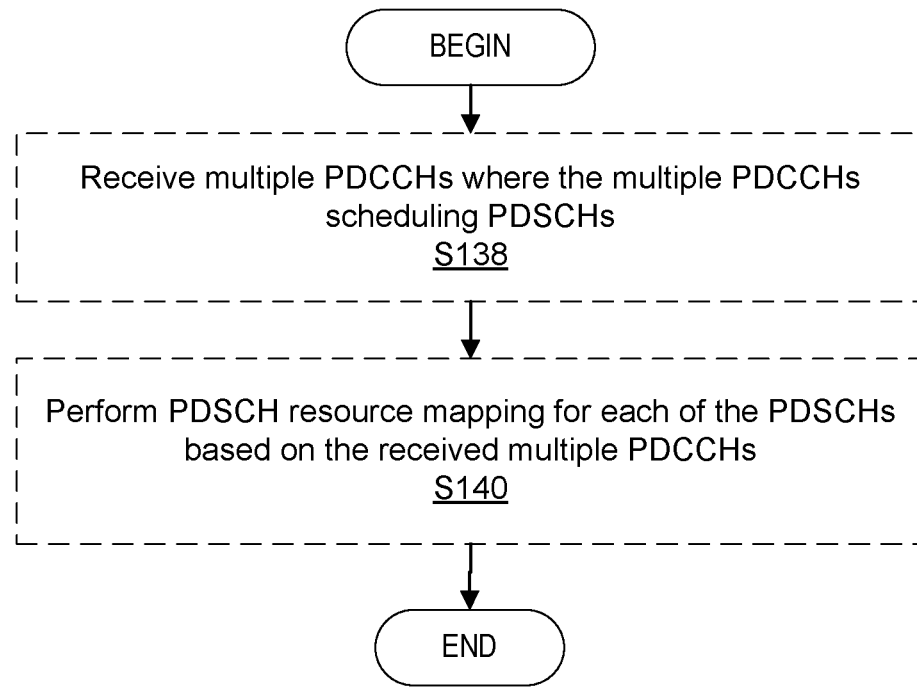
FIG. 13 is a flowchart of an exemplary process in a wireless device for resource mapping unit according to some embodiments of the present disclosure.

FIG. 13 is a flowchart of an exemplary process in a wireless device 22 according to some embodiments of the present disclosure for performing PDSCH resource mapping. One or more Blocks and/or functions and/or methods performed by WD 22 may be performed by one or more elements of WD 22 such as by resource mapping unit 34 in processing circuitry 84, processor 86, radio interface 82, etc., according to the example method. The example method includes optionally one or more of receiving (block S138), such as via radio interface 82, multiple PDCCHs where the multiple PDCCHs schedule PDSCHs; and performing (block S14), such as via resource mapping unit 34 in processing circuitry 84, PDSCH resource mapping for each of the PDSCHs based on the received multiple PDCCHs.

In some embodiments, the method further includes one or more of receiving, such as via radio interface 82, each of the PDSCHs at least partially overlapping in the time domain; and receiving, such as via radio interface 82, each of the PDSCHs with one of a common set of PDSCH resource mapping patterns and different sets of PDSCH resource mapping patterns. In some embodiments, the performing the PDSCH resource mapping is based on all or a subset of downlink control information (DCI) messages in the received PDCCHs. In some embodiments, each of the PDCCHs received within a time-frequency resource is received in a different control resource set (CORESET) and each CORESET is associated with an active transmission configuration indicator (TCI) state. In some embodiments, each CORESET with an active TCI state corresponds to one of a transmission point (TRP) and a panel, the one of the TRP and the panel transmitting the corresponding PDCCH. In some embodiments, the performance of the PDSCH resource mapping is based on PDSCH resource mapping information indicated in at least one downlink control information (DCI) message from the received multiple PDCCHs.

In some embodiments, the PDSCH resource mapping information indicated in the at least one DCI message includes at least one of a rate matching indicator field and a zero power (ZP) channel state information-reference signal (CSI-RS) trigger field. In some embodiments, the PDSCH resource mapping information indicated by the at least one DCI message is configured via radio resource control (RRC) signaling. In some embodiments, the time-frequency resource corresponds to at least one of a slot and a set of CORESETs. In some embodiments, the performing the PDSCH resource mapping for each of the PDSCHs based on the received multiple PDCCHs further includes one or more of identifying at least one downlink control information (DCI) message from the received multiple PDCCHs; and applying a PDSCH resource mapping pattern indicated in the at least one DCI message to the PDSCH corresponding to the PDCCH carrying the DCI message. In some embodiments, the performing the PDSCH resource mapping for each of the PDSCHs based on the received multiple PDCCHs further comprises one or more of identifying the downlink control information (DCI) messages from the received multiple PDCCHs; and applying a joint pattern to the PDSCHs corresponding to the DCI messages, the joint pattern being a union of PDSCH resource mapping patterns indicated in the DCI messages. In some embodiments, the performing the PDSCH resource mapping for each of the PDSCHs based on the received multiple PDCCHs further comprises one or more of applying a first PDSCH resource mapping pattern to PDSCHs in a first time region; and applying a second PDSCH resource mapping pattern to PDSCHs in a second time region, the first time region associated with overlapping PDSCHs and the second time region associated with non-overlapping PDSCHs. In some embodiments, the PDSCH resource mapping includes rate matching around non-zero power (NZP CSI-RS) resources indicated by an active transmission configuration indicator (TCI) state.

Figure 14:
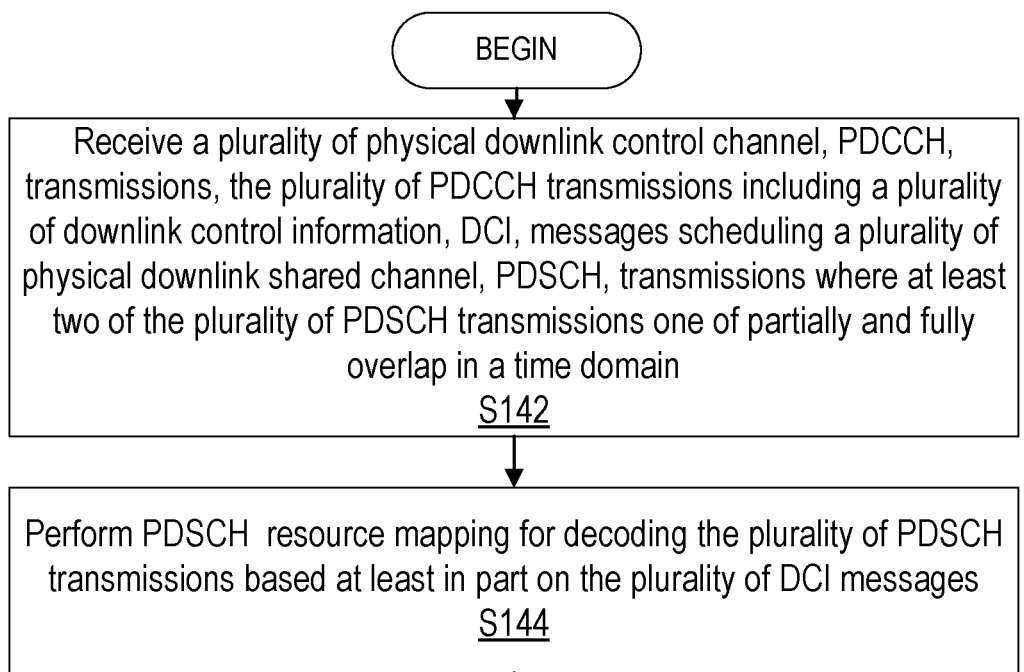
FIG. 14 is a flowchart of another exemplary process in a wireless device for resource mapping unit according to some embodiments of the present disclosure.

FIG. 14 is a flowchart of an exemplary process implemented by wireless device 22 according to some embodiments of the present disclosure. One or more Blocks and/or functions performed by wireless device 22 may be performed by one or more elements of wireless device 22 such as by resource mapping unit 34 in processing circuitry 84, processor 86, radio interface 82, etc. In one or more embodiments, wireless device such as via one or more of processing circuitry 84, processor 86, resource mapping unit 34 and radio interface 82 is configured to receive (block S142) a plurality of physical downlink control channel, PDCCH, transmissions where the plurality of PDCCH transmissions includes a plurality of downlink control information, DCI, messages scheduling a plurality of physical downlink shared channel, PDSCH, transmissions, and where at least two of the plurality of PDSCH transmissions one of partially and fully overlap in a time domain, as described herein. In one or more embodiments, wireless device such as via one or more of processing circuitry 84, processor 86, resource mapping unit 34 and radio interface 82 is configured to perform (block S144) PDSCH resource mapping for decoding the plurality of PDSCH transmissions based at least in part on the plurality of DCI messages, as described herein.

According to one or more embodiments, each of the plurality of DCI messages is detected within a respective control resource set, CORESET, of a plurality of CORESETs where each CORESET is associated with a CORESET group identifier and at least one common reference signal, CRS, pattern. The PDSCH resource mapping is based at least in part on the CRS patterns. According to one or more embodiments, each of the plurality of CORESETs are associated with a corresponding CRS parameter indicating the at least one CRS pattern. According to one or more embodiments, the PDSCH resource mapping is based at least in part on a union of the CRS patterns associated with the CORESET group identifier of the CORESET in which the DCI scheduling the PDSCH is detected.

According to one or more embodiments, each CRS pattern indicates resources that are unavailable for PDSCH to resource element mapping. According to one or more embodiments, a plurality of common reference signal, CRS, patterns for the PDSCH resource mapping are configured. The PDSCH resource mapping is performed based at least in part on a union of the configured plurality of CRS patterns when the plurality of DCI messages are detected at the wireless device. According to one or more embodiments, each of the plurality of DCI messages indicates a resource element, RE, level PDSCH resource mapping information. The PDSCH resource mapping is performed based at least in part on the RE-level PDSCH resource mapping information indicated by each of the plurality of DCI messages.

According to one or more embodiments, each of the plurality of DCI messages indicates at least one ZP CSI-RS resource for PDSCH resource mapping. The PDSCH resource mapping for each of the plurality of PDSCHs is based at least in part on the at least one ZP CSI-RS resource indicated by the respective DCI scheduling each PDSCH. According to one or more embodiments, at least one ZP CSI-RS resource is indicated via a ZP CSI-RS trigger. According to one or more embodiments, the plurality of PDCCH transmissions are received within a communication slot. According to one or more embodiments, each of the plurality of PDCCH transmissions are associated with a respective network node.

Figure 15:
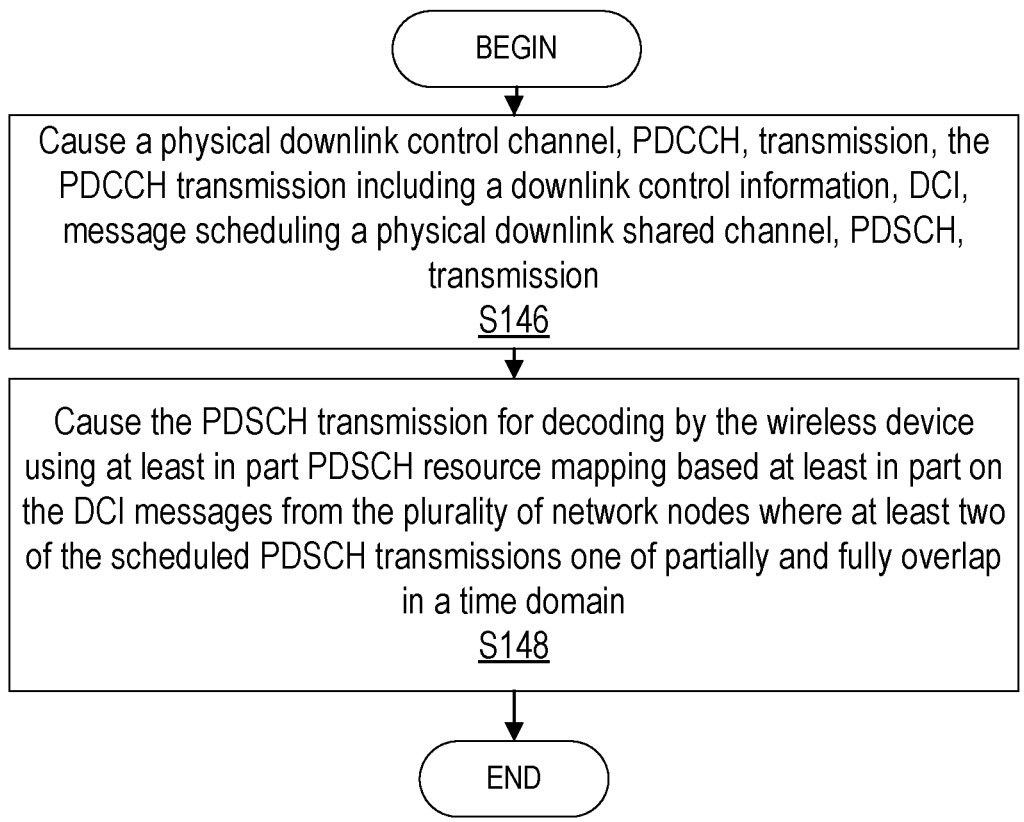
FIG. 15 is a flowchart of an exemplary process in a system for resource mapping unit according to some embodiments of the present disclosure.

FIG. 15 is a flowchart of an exemplary process implemented by one or more elements of system 10 according to some embodiments of the present disclosure. One or more Blocks and/or functions performed by network node 16 may be performed by one or more elements of network node 16 such as by control channel unit 32 in processing circuitry 68, processor 70, radio interface 62, etc. One or more Blocks and/or functions performed by wireless device 22 may be performed by one or more elements of wireless device 22 such as by resource mapping unit 34 in processing circuitry 84, processor 86, radio interface 82, etc. In one or more embodiments, a plurality of network nodes 16 are configured to communicate with a wireless device 22.

In one or more embodiments, each of the plurality of network nodes 16 such as via one or more of processing circuitry 68, processor 70, control channel unit 32, communication interface 60 and radio interface 62 is configured to cause (Block S146) a physical downlink control channel, PDCCH, transmission where the PDCCH transmission includes a downlink control information, DCI, message scheduling a physical downlink shared channel, PDSCH, transmission, as described herein. In one or more embodiments, each of the plurality of network nodes 16 such as via one or more of processing circuitry 68, processor 70, control channel unit 32, communication interface 60 and radio interface 62 is configured to cause (Block S148) the PDSCH transmission for decoding by the wireless device 22 using at least in part PDSCH resource mapping based at least in part on the DCI messages from the plurality of network nodes 16 where at least two of the scheduled PDSCH transmissions one of partially and fully overlapping in a time domain, as described herein.

According to one or more embodiments, each DCI message is transmitted within a respective control resource set, CORESET, of a plurality of CORESETs where each CORESET is associated with a CORESET group identifier and at least one common reference signal, CRS, pattern. The PDSCH resource mapping is based at least in part on the CRS patterns. According to one or more embodiments, each of the plurality of CORESETs are associated with a CRS parameter indicating the at least one CRS pattern. According to one or more embodiments, the PDSCH resource mapping is based at least in part on a union of the CSI patterns associated with the CORESET group identifier of the CORESET in which the DCI scheduling the PDSCH is detected.

According to one or more embodiments, each CRS pattern indicates resources that are unavailable for PDSCH to resource element mapping. According to one or more embodiments, a plurality of common reference signal, CRS, patterns for PDSCH resource mapping are configured where the PDSCH resource mapping is based at least in part on a union of the configured plurality of CRS patterns when the plurality of DCI messages are detected at the wireless device. According to one or more embodiments, each of the DCI messages indicates a resource element, RE, level PDSCH resource mapping information where the PDSCH resource mapping is based at least in part on the RE-level PDSCH resource mapping information indicated by each of the DCI messages According to one or more embodiments, each of the DCI messages indicates at least one ZP CSI-RS resource for PDSCH resource mapping where the PDSCH resource mapping for each PDSCH is based at least in part on the at least one ZP CSI-RS resource indicated by the respective DCI scheduling each PDSCH. According to one or more embodiments, at least one ZP CSI-RS resource is indicated via a ZP CSI-RS trigger. According to one or more embodiments, the PDCCH transmissions are received within a communication slot. According to one or more embodiments, each network node 16 corresponds to a respective network node.

Having generally described some embodiments for resource mapping and, in particular, for PDSCH resource mapping with multiple PDCCHs, according to some embodiments, a more detailed description of some of the embodiments is described below.

Also, although the example embodiments described below may be discussed with reference to the WD 22 receiving PDCCHs for scheduling PDSCHs, it should be understood that in some embodiments the network node 16 configures, prepares and/or transmits in the DL direction such PDCCHs and PDSCHs, even where not expressly indicated.

Embodiment one: In a first embodiment, WD procedures for PDSCH resource mapping with RB symbol-level granularity when receiving multiple PDCCH within the same slot are provided.

In some embodiments, the WD 22 such as via one or more of processing circuitry 84, processor 86, radio interface 82, resource mapping unit 34, etc., receives multiple PDCCHs scheduling PDSCHs, typically from multiple TRPs (although this may not always be the case). In some other embodiments, the multiple PDCCHs may be received from the same TRP, or multiple panels in the same downlink slot where at least two of the PDSCHs may partially or fully overlap in the time domain. Each PDCCH may be received in a different CORESET. Each CORESET may have an associated active transmission configuration indicator (TCI) state which corresponds to the TRP or panel transmitting the PDCCH. Some of the multiple PDCCHs may also be received from the same CORESET, using different search spaces or even two or more PDCCH candidates in the same search space.

When multiple PDCCHs are received such as via one or more of processing circuitry 84, processor 86, radio interface 82, resource mapping unit 34, etc., in some scenarios, the DCI messages in the multiple PDCCHs may indicate different RB and symbol-level PDSCH resource mapping information via e.g., the 'Rate matching indicator' field. In such embodiments, the WD 22 such as via one or more of processing circuitry 84, processor 86, radio interface 82, resource mapping unit 34, etc., may perform PDSCH resource mapping by taking into account the RB and symbol-level PDSCH resource mapping information indicated in all the received DCI messages from the multiple PDCCHs that the WD 22 received in a slot.

Figure 16:
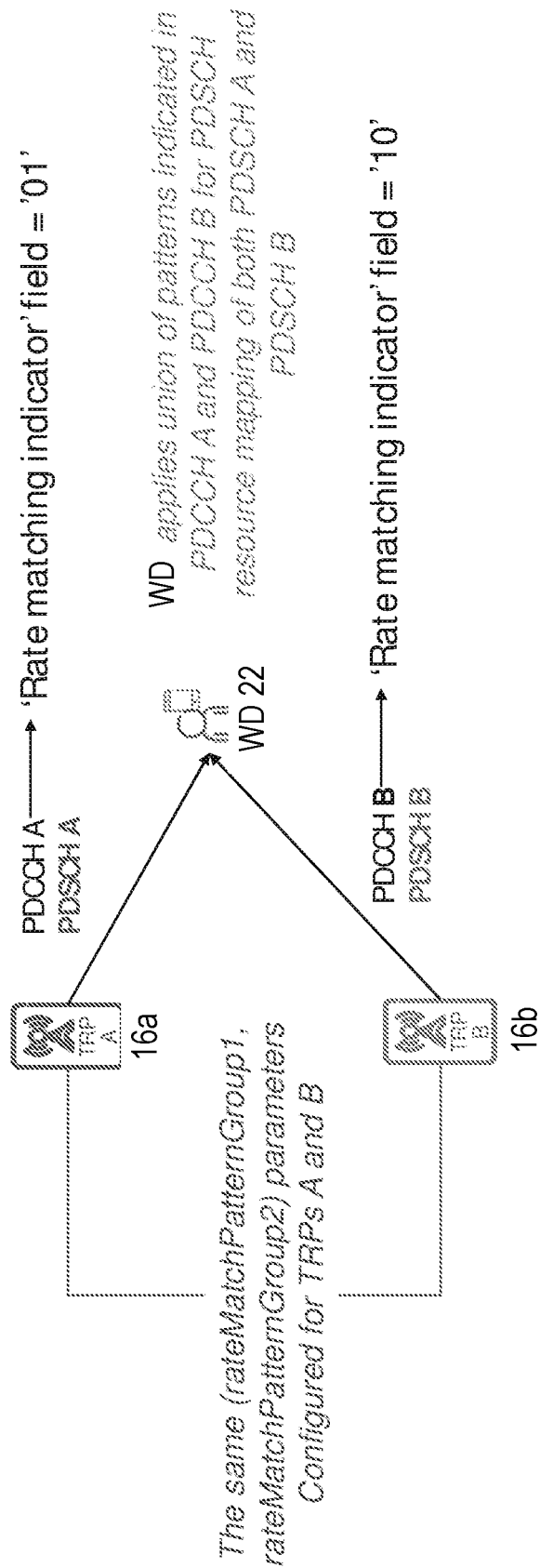
FIG. 16 shows a first example illustrating WD PDSCH resource mapping behavior when different 'Rate matching indicator' fields are indicated in different PDCCHs received in the same slot according to one embodiment of the present disclosure.

In one specific embodiment, a WD 22 such as via one or more of processing circuitry 84, processor 86, radio interface 82, resource mapping unit 34, etc., is configured with the same pair of higher layer parameters rateMatchPatternGroup1 and rateMatchPatternGroup2 where both parameters apply to the multiple PDSCHs, typically from the multiple TRPs/Panels. However, the 'Rate matching indicator' field value indicated in the different PDCCHs received in the same slot may be different. FIG. 16 shows an example where PDCCH A scheduling PDSCH A indicates a 'Rate matching indicator' field value of '01' (meaning rateMatchPatternGroup2 is to be used) while PDCCH B scheduling PDSCH B indicates a 'Rate matching indicator' field value of '10' (meaning rateMatchPatternGroup1 is to be used).

In one specific embodiment, the WD 22 such as via one or more of processing circuitry 84, processor 86, radio interface 82, resource mapping unit 34, etc., uses the union of the patterns indicated by the 'Rate matching indicator' fields in the different PDCCHs received in the slot to the corresponding PDSCHs scheduled by these PDCCHs. That is, any RE that is included in at least one of the patterns indicated by the 'Rate matching indicator' fields in the different PDCCHs received in the slot may, for example, be declared as unavailable for the PDSCHs scheduled by the DCIs in the PDCCHs.

In the above described embodiments, the rate matching of a PDSCH may depend on all the PDCCHs received within a slot (or other time duration or other radio resource), e.g., because the union of all rate matching indications across all received PDCCHs may be used to determine the rate matching of the PDSCH. This may imply that the WD 22 cannot proceed to decode a PDSCH before all PDCCH candidates in the slot (or other time duration or other radio resource) have been found, which may impact the processing timeline at the WD 22. Restricting which PDCCH has the possibility to impact the rate matching of a PDSCH may therefore be beneficial.

In one embodiment, the WD 22 such as via one or more of processing circuitry 84, processor 86, radio interface 82, resource mapping unit 34, etc., is configured, as part of the CORESET configuration, in which sets of CORESETs where PDCCHs that may mutually impact the rate matching of PDSCH may be received. For example, a set of "linked" CORESETs may be configured, for example, by listing groups of CORESET IDs. Each PDCCH received within the one of the linked/grouped CORESETs will (potentially) impact the rate matching of a PDSCH scheduled by one of the PDCCHs received within one of the linked CORESETs. In another embodiment, the CORESET configuration comprises a Boolean flag, which if set to 'true' indicates that the CORESET is linked with all of the other CORESETs which has the Boolean flag set to 'true'. In another variation of the embodiment, the CORESET configuration comprises a "CORESET group ID", where all of the CORESETs configured with the same group ID are considered to be linked/grouped together. Alternatively, the linkage of PDCCHs that mutually impact the rate matching of a PDSCH may be performed on a search space-level.

In another embodiment, a restriction is imposed such that only PDCCHs received within the same carrier impact the rate matching of their respective scheduled PDSCHs. That is, a PDCCH transmitted on a first carrier and which cross-carrier schedules a PDSCH on a second carrier is not assumed e.g., by the WD 22 to impact the rate matching of a PDCCH transmitted on the second carrier (which PDCCH transmitted on the second carrier scheduled another PDSCH on the second carrier which overlaps with the PDSCH). Alternatively, such cross-carrier restriction may only apply if the first and second carrier have different numerologies.

It should be noted that it may be beneficial to configure a common rate matching pattern between multiple TRPs/panels to protect control channel transmission from the TRPs/panels. At the same time, each TRP may have other TRP specific signals that may be protected. Hence, applying a union of rate matching patterns indicated by multiple PDCCHs may be beneficial in some scenarios.

Figure 17:
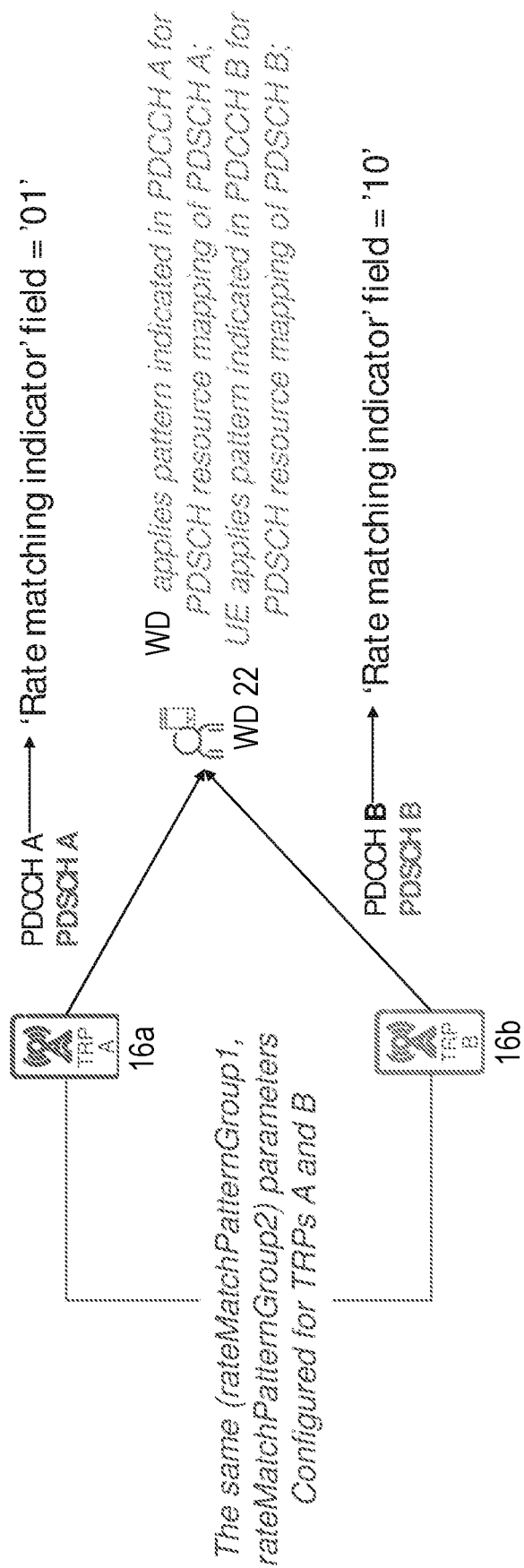
FIG. 17 shows a second example illustrating WD PDSCH resource mapping behavior when different 'Rate matching indicator' fields are indicated in different PDCCHs received in the same slot according to one embodiment of the present disclosure.

In another specific embodiment, the WD 22 such as via one or more of processing circuitry 84, processor 86, radio interface 82, resource mapping unit 34, etc., uses the pattern indicated by the 'Rate matching indicator' field in the DCI of a given PDCCH for PDSCH resource mapping of the corresponding PDSCH indicated by that DCI. FIG. 17 shows an example where PDCCH A scheduling PDSCH A indicates a 'Rate matching indicator' field value of '01' (meaning rateMatchPatternGroup2 is to be used) while PDCCH B scheduling PDSCH B indicates a 'Rate matching indicator' field value of '10' (meaning rateMatchPatternGroup1 is to be used).

In this embodiment, the WD 22 such as via one or more of processing circuitry 84, processor 86, radio interface 82, resource mapping unit 34, etc., uses the pattern indicated by the 'Rate matching indicator' field in PDCCH A for PDSCH resource mapping of PDSCH A, and uses the pattern indicated by 'Rate matching indicator' field in PDCCH B for PDSCH resource mapping of PDSCH B. This embodiment may be useful in scenarios where the TPRs are connected by non-ideal backhaul where exchange of dynamic information between TRPs, such as rate matching pattern to be indicated in DCI, is not possible. Accordingly, some embodiments may beneficially provide for the WD 22 to use the rate matching pattern indicated in a given PDCCH for PDSCH resource mapping of the PDSCH associated with the respective PDCCH.

Even though the rate matching indication for a PDSCH may be self-contained, and may only depend on the scheduling PDCCH, rate matching can still be applied around CORESETs and other reference signals corresponding to multiple TRPs, in some embodiments. In one embodiment, the WD 22 is configured with rate matching patterns corresponding to both TRPs in each of rateMatchPatternGroup1 and rateMatch PatternGroup2.

Figure 18:
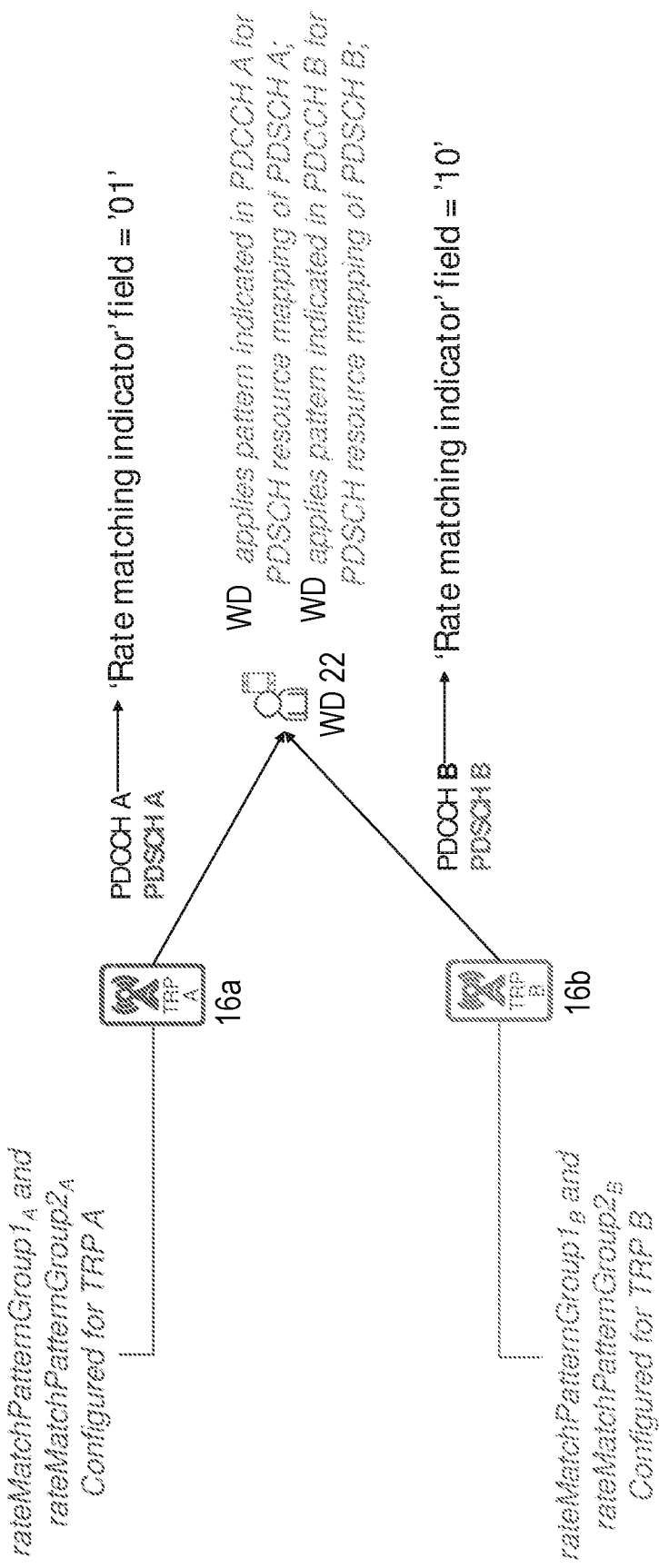
FIG. 18 shows a third example illustrating WD PDSCH resource mapping behavior when different 'Rate matching indicator' fields are indicated in different PDCCHs received in the same slot according to one embodiment of the present disclosure.

In a third specific embodiment, a WD 22 such as via one or more of processing circuitry 84, processor 86, radio interface 82, resource mapping unit 34, etc., is configured with different higher layer parameter pairs rateMatchPatternGroup1 and rateMatchPatternGroup2 for each PDSCH to be received from a given TRP/Panel. In this case, the 'Rate matching indicator' field indicated in a PDCCH will indicate one or both of rateMatchPatternGroup1 and rateMatchPatternGroup2 corresponding to the PDSCH scheduled by the DCI in that PDCCH. FIG. 18 shows an example where PDCCH A scheduling PDSCH A indicates a 'Rate matching indicator' field value of '01' (meaning rateMatchPatternGroup2$_A$ is to be used) while PDCCH B scheduling PDSCH B indicates a 'Rate matching indicator' field value of '10' (meaning rateMatchPatternGroup1B is to be used). This may for instance be realized by configuring the rateMatchPatternGroup1 and rateMatchPatternGroup2 on a per-CORESET or per search space basis rather than on per BWP basis.

In this example, the WD 22 such as via one or more of processing circuitry 84, processor 86, radio interface 82, resource mapping unit 34, etc., uses rateMatchPatternGroup2$_A$ indicated by the 'Rate matching indicator' field in PDCCH A for PDSCH resource mapping of PDSCH A, and uses rateMatchPatternGroup1$_B$ indicated by 'Rate matching indicator' field in PDCCH B for PDSCH resource mapping of PDSCH B. One benefit of this embodiment may be that more than two rate match pattern groups can be defined (i.e., pairs of groups defined for each PDSCH) and each pair of groups can be dynamically indicated by the corresponding PDCCH.

Figure 19:
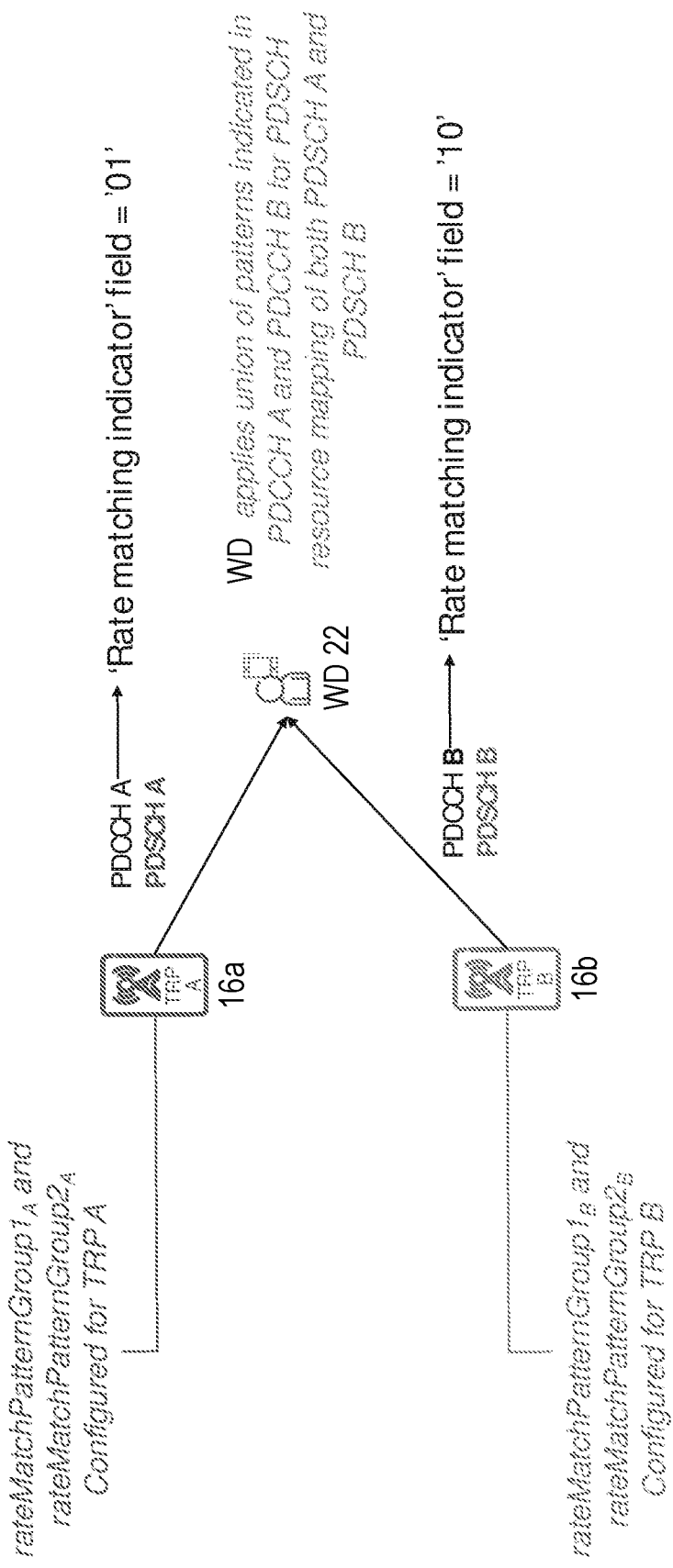
FIG. 19 shows a fourth example illustrating WD PDSCH resource mapping behavior when different 'Rate matching indicator' fields are indicated in different PDCCHs received in the same slot according to one embodiment of the present disclosure.

In a fourth specific embodiment, a WD 22 such as via one or more of processing circuitry 84, processor 86, radio interface 82, resource mapping unit 34, etc., is configured with different higher layer parameter pairs rateMatchPatternGroup1 and rateMatchPatternGroup2 for each PDSCH to be received from a given TRP/Panel. In this case, the 'Rate matching indicator' field indicated in a PDCCH will indicate one or both of rateMatchPatternGroup1 and rateMatchPatternGroup2 corresponding to the PDSCH scheduled by the DCI in that PDCCH. FIG. 19 shows an example where PDCCH A scheduling PDSCH A indicates a 'Rate matching indicator' field value of '01' (meaning rateMatchPatternGroup2$_A$ is to be used) while PDCCH B scheduling PDSCH B indicates a 'Rate matching indicator' field value of '10' (meaning rateMatchPatternGroup1$_B$ is to be used).

In this example, the WD 22 such as via one or more of processing circuitry 84, processor 86, radio interface 82, resource mapping unit 34, etc., uses a union of rateMatchPatternGroup2$_A$ indicated by the 'Rate matching indicator' field in PDCCH A and rateMatchPatternGroup1$_B$ indicated by 'Rate matching indicator' field in PDCCH B for PDSCH resource mapping of both PDSCH A and PDSCH B.

One benefit of this specific embodiment may that such embodiment can extend well to the case of more than two TRPs. Because each PDCCH's pair of rateMatchPatternGroup1 and rateMatchPatternGroup2 can be made TRP-specific, rate matching for any combination of active TPRs becomes possible by taking the union of the indicated rate matchings.

As mentioned above when taking the union of the indicated rate matchings in some embodiments, a WD 22 may not be able to proceed to decode a PDSCH before all PDCCH candidates in the slot (or other time duration or other radio resource) have been found. Apart from impacting the processing timeline at the WD 22, robustness may also be affected because the decoding of a single PDSCH becomes dependent on correctly decoding all the PDCCHs. Since there may be a trade-off between enabling proper and flexible rate matching on one hand, and robustness and ease of processing on the other hand, it could be beneficial to be able to indicate to the WD 22 whether or not the union with other PDCCHs 'Rate matching indicators' should be considered for PDSCH mapping. In one specific embodiment, the 'Rate matching indicator' could have an additional bit to indicate if the union with other PDCCHs rate matching indications should be considered. In another specific embodiment, each 'Rate matching indicator' field is instead pre-configured to also indicate if the union with other PDCCHs rate matching indications should be considered. In one example, rateMatchPatternGroup1 could be tailored for rate matching of a single specific TRP, while rateMatchPatternGroup2 could include rate matching for all TRPs. In this case, some embodiments may tie (e.g., determined rule) 'Rate matching indicator' field value of '10' (meaning rateMatchPatternGroup1 is to be used) to use the union with other PDCCHs' rate matching indications to enable flexible multi-TRP rate matching, while 'Rate matching indicator' field value of '01' (meaning rateMatchPatternGroup2 is to be used) could be tied (e.g., determined rule) to indicate to the WD 22 to NOT use the union with other PDCCHs' rate matching indications, e.g., for robustness and ease of processing.

In some scenarios, the number of bits in the 'Rate matching indicator' field can be different in the multiple PDCCHs scheduling PDSCHs from multiple TRPs or multiple panels in the same downlink slot. The example embodiments illustrated in FIGS. 16-19 can be extended to these scenarios with unequal number of bits in the 'Rate matching indicator' field.

Embodiment two: WD (e.g., WD 22) procedures for PDSCH resource mapping with RE-level granularity when receiving multiple PDCCH within the same slot are provided.

In some aspects, this embodiment may be an extension of Embodiment one (discussed above) except where the PDSCH resource mapping pattern has an RE-level granularity (instead of symbol-level granularity, as with embodiment one). When multiple PDCCHs are received, in some scenarios, the DCI messages in the multiple PDCCHs may indicate different RE-level PDSCH resource mapping information via the 'ZP CSI-RS trigger' field. In this embodiment, the WD 22 such as via one or more of processing circuitry 84, processor 86, radio interface 82, resource mapping unit 34, etc., may perform PDSCH resource mapping by taking into account the RE-level PDSCH resource mapping information indicated in all the received DCI messages from the multiple PDCCHs it received in a slot.

Figure 20:
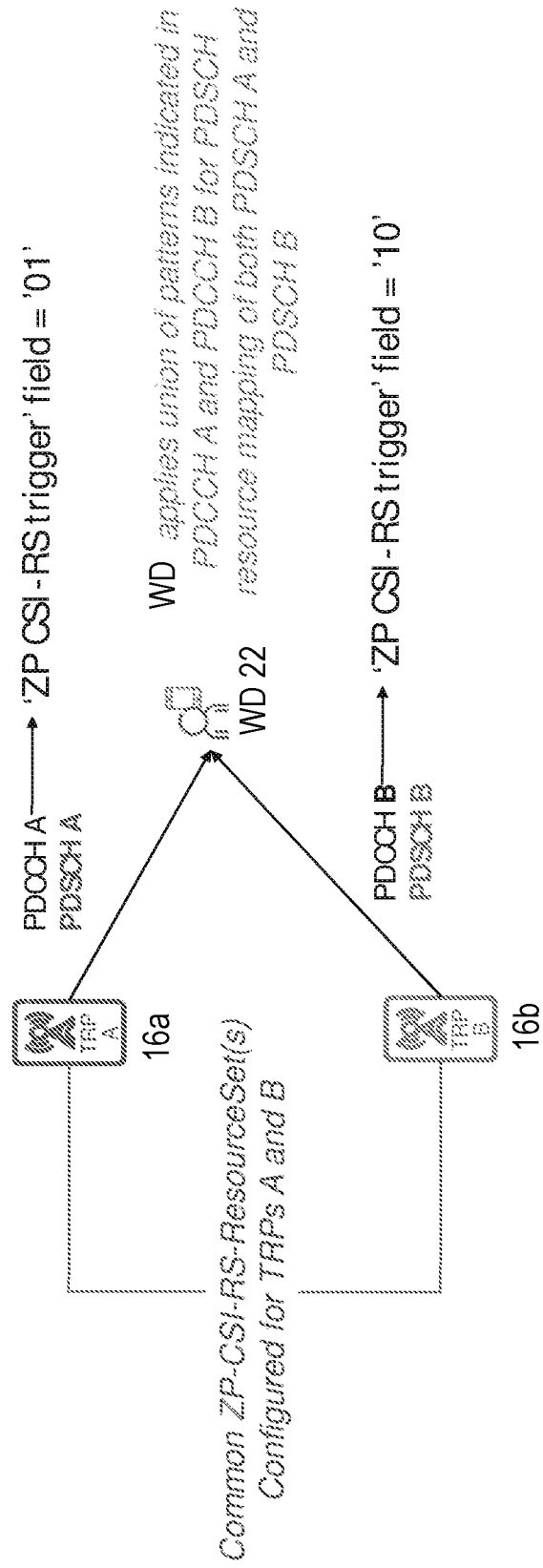
FIG. 20 shows a first example illustrating WD PDSCH resource mapping behavior when different 'ZP CSI-RS trigger' fields are indicated in different PDCCHs received in the same slot according to one embodiment of the present disclosure.

In one specific embodiment, a WD 22 such as via one or more of processing circuitry 84, processor 86, radio interface 82, resource mapping unit 34, etc., is configured with common ZP-CSI-RS-ResourceSet(s) that apply to the PDSCHs from the multiple TRPs/Panels. However, the 'ZP CSI-RS trigger' field value indicated in the different PDCCHs received in the same slot may be different. FIG. 20 shows an example where PDCCH A scheduling PDSCH A indicates a 'ZP CSI-RS trigger' field value of '01' (meaning the first ZP-CSI-RS-ResourceSet is to be used) while PDCCH B scheduling PDSCH B indicates a 'ZP CSI-RS trigger' field value of '10' (meaning the second ZP-CSI-RS-ResourceSet is to be used). In one specific embodiment, the WD 22 such as via one or more of processing circuitry 84, processor 86, radio interface 82, resource mapping unit 34, etc., uses the union of the patterns indicated by the 'ZP CSI-RS trigger' fields in the different PDCCHs received in the slot to the corresponding PDSCHs scheduled by these PDCCHs. That is, any RE that is included in at least one of the patterns indicated by the 'ZP CSI-RS trigger' fields in the different PDCCHs received in the slot may be declared as unavailable for the PDSCHs scheduled by the DCIs in the PDCCHs. It should be noted that configuring common rate matching pattern may be beneficial in this case between multiple TRPs/panels to protect NZP CSI-RS transmission from the TRPs/panels.

Figure 21:
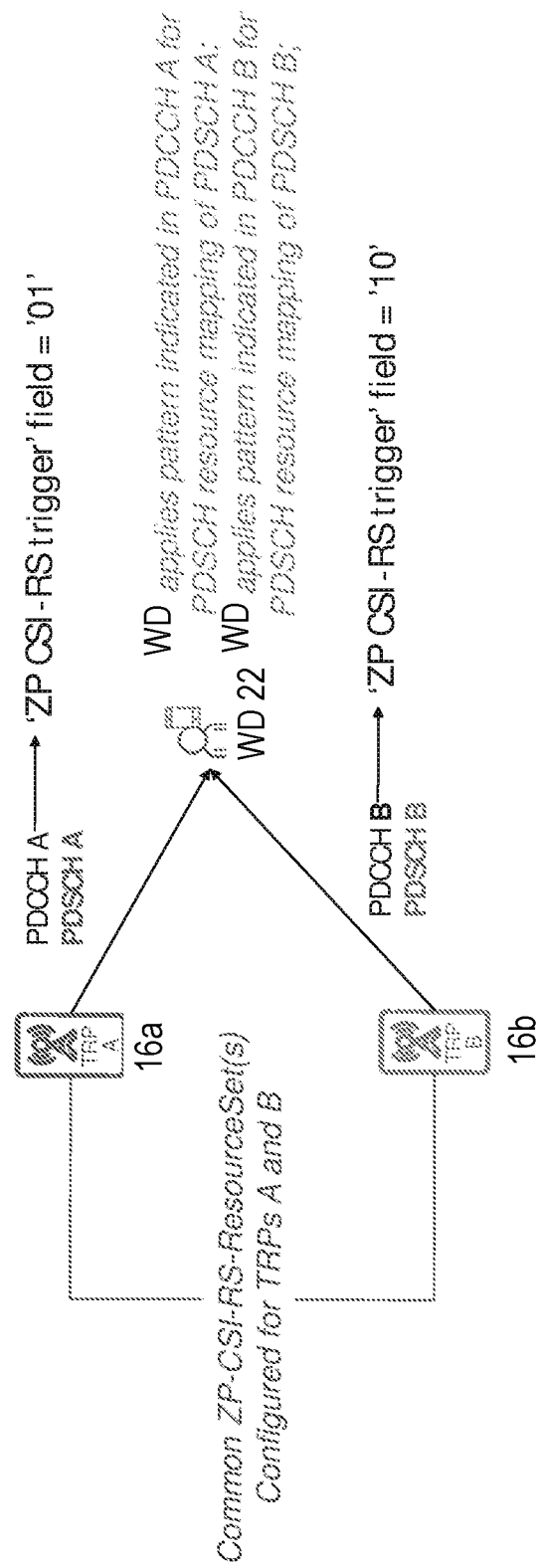
FIG. 21 shows a second example illustrating WD PDSCH resource mapping behavior when different 'ZP CSI-RS trigger' fields are indicated in different PDCCHs received in the same slot according to one embodiment of the present disclosure.

In another specific embodiment, the WD 22 such as via one or more of processing circuitry 84, processor 86, radio interface 82, resource mapping unit 34, etc., uses the pattern indicated by the 'ZP CSI-RS trigger' field in the DCI of a given PDCCH for PDSCH resource mapping of the corresponding PDSCH indicated by that DCI. FIG. 21 shows an example where PDCCH A scheduling PDSCH A indicates a 'ZP CSI-RS trigger' field value of '01' (meaning the first ZP-CSI-RS-ResourceSet is to be used) while PDCCH B scheduling PDSCH B indicates a 'ZP CSI-RS trigger' field value of '10' (meaning the second ZP-CSI-RS-ResourceSet is to be used). In this embodiment, the WD 22 such as via one or more of processing circuitry 84, processor 86, radio interface 82, resource mapping unit 34, etc., uses the pattern indicated by the 'ZP CSI-RS trigger' field in PDCCH A for PDSCH resource mapping of PDSCH A, and uses the pattern indicated by 'ZP CSI-RS trigger' field in PDCCH B for PDSCH resource mapping of PDSCH B. This embodiment may be useful in scenarios where the TRPs are connected by a non-ideal backhaul where exchange of dynamic information between TRPs, such as rate matching pattern to be indicated in DCI, is not possible. Hence, the WD 22 such as via one or more of processing circuitry 84, processor 86, radio interface 82, resource mapping unit 34, etc., may use the rate matching pattern indicated in a given PDCCH for PDSCH resource mapping of the PDSCH associated with that PDCCH.

Figure 22:
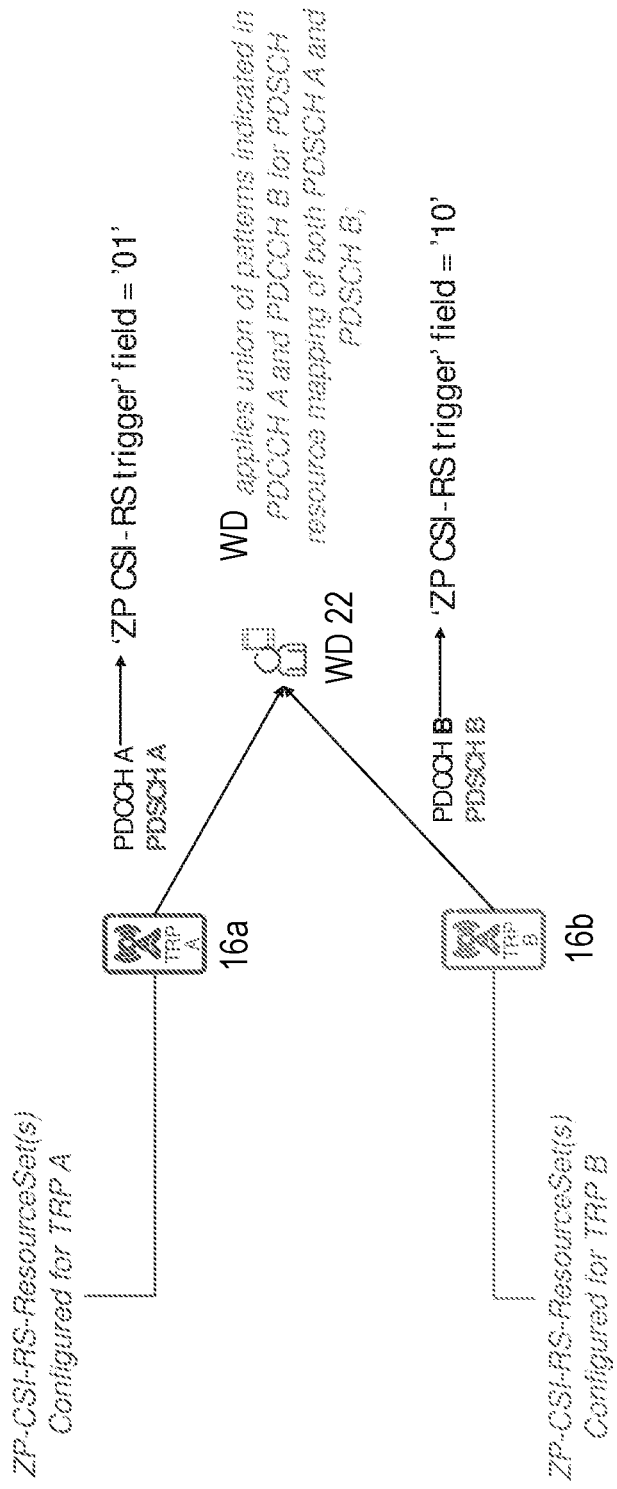
FIG. 22 shows a third example illustrating WD PDSCH resource mapping behavior when different 'ZP CSI-RS trigger' fields are indicated in different PDCCHs received in the same slot according to one embodiment of the present disclosure.

In a third specific embodiment, a WD 22 such as via one or more of processing circuitry 84, processor 86, radio interface 82, resource mapping unit 34, etc., is configured with different lists of ZP-CSI-RS-ResourceSet(s) for each PDSCH to be received from a given TRP/Panel. In this case, the 'ZP CSI-RS trigger' field indicated in a PDCCH may indicate one of the ZP-CSI-RS-ResourceSet(s), or no rate matching corresponding to the PDSCH scheduled by the DCI in that PDCCH. FIG. 22 shows an example where PDCCH A scheduling PDSCH A indicates a 'ZP CSI-RS trigger' field value of '01' (meaning the first ZP-CSI-RS-ResourceSet corresponding to PDSCH A is to be used) while PDCCH B scheduling PDSCH B indicates a 'ZP CSI-RS trigger' field value of '10' (meaning the second ZP-CSI-RS-ResourceSet corresponding to PDSCH B is to be used). In this example, the WD 22 such as via one or more of processing circuitry 84, processor 86, radio interface 82, resource mapping unit 34, etc., uses the ZP-CSI-RS-ResourceSet indicated by the 'ZP CSI-RS trigger' field in PDCCH A for PDSCH resource mapping of PDSCH A, and uses the ZP-CSI-RS-ResourceSet indicated by 'ZP CSI-RS trigger' field in PDCCH B for PDSCH resource mapping of PDSCH B. One benefit of this embodiment may be allowing PDSCH to be rate matched around aperiodic NZP CSI-RS resources allocated to other WDs 22, or around CSI-IM resources.

Figure 23:
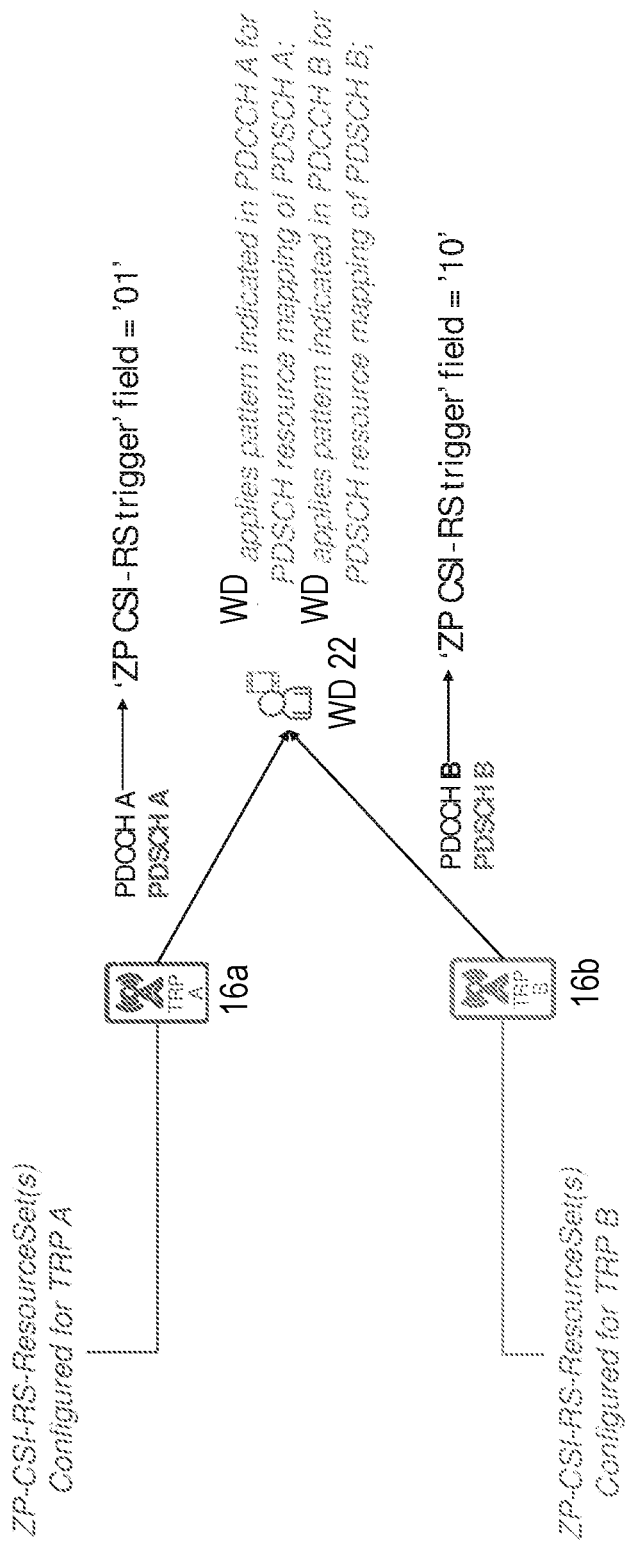
FIG. 23 shows a fourth example illustrating WD PDSCH resource mapping behavior when different 'ZP CSI-RS trigger' fields are indicated in different PDCCHs received in the same slot according to one embodiment of the present disclosure.

In a fourth specific embodiment, a WD 22 such as via one or more of processing circuitry 84, processor 86, radio interface 82, resource mapping unit 34, etc., is configured with different lists of ZP-CSI-RS-ResourceSet(s) for each PDSCH to be received from a given TRP/Panel. In this case, the 'ZP CSI-RS trigger' field indicated in a PDCCH will indicate one of the ZP-CSI-RS-ResourceSet(s), or no rate matching corresponding to the PDSCH scheduled by the DCI in that PDCCH. FIG. 23 shows an example where PDCCH A scheduling PDSCH A indicates a 'ZP CSI-RS trigger' field value of '01' (meaning the first ZP-CSI-RS-ResourceSet corresponding to PDSCH A is to be used) while PDCCH B scheduling PDSCH B indicates a 'ZP CSI-RS trigger' field value of '10' (meaning the second ZP-CSI-RS-ResourceSet corresponding to PDSCH B is to be used). In this example, the WD 22 such as via one or more of processing circuitry 84, processor 86, radio interface 82, resource mapping unit 34, etc., may use a union of ZP-CSI-RS-ResourceSet indicated by 'ZP CSI-RS trigger' field in PDCCH A and ZP-CSI-RS-ResourceSet indicated by 'ZP CSI-RS trigger' field in PDCCH B for PDSCH resource mapping of both PDSCH A and PDSCH B.

In some scenarios, the number of bits in the 'ZP CSI-RS trigger' field can be different in the multiple PDCCHs scheduling PDSCHs from multiple TRPs, or multiple panels in the same downlink slot. The example embodiments in FIGS. 20-23 can be extended to these scenarios with unequal number of bits in the 'ZP CSI-RS trigger' field.

This embodiment may be another extension of Embodiment one (discussed above) except where the PDSCH resource mapping pattern has RE-level granularity. When multiple PDCCHs are received, in some scenarios, the DCI messages in the multiple PDCCHs level PDSCH resource mapping information by different association of DCI to the parameter lte-CRS-ToMatchAround In some embodiments, the WD 22 such as via one or more of processing circuitry 84, processor 86, radio interface 82, resource mapping unit 34, etc., performs PDSCH resource mapping by taking into account the RE-level PDSCH resource mapping information of the parameters lte-CRS-ToMatchAround indicated by all the received DCI messages from the multiple PDCCHs that the WD 22 received in a slot.

The indication of the parameter lte-CRS-ToMatchAround per PDCCH can for example be achieved by configuring a parameter lte-CRS-ToMatchAround to each TCI state individually. Hence, when WD 22 such as via one or more of processing circuitry 84, processor 86, radio interface 82, resource mapping unit 34, etc., receives a PDSCH scheduling, the TCI state informs the WD 22 of the parameter lte-CRS-ToMatchAround to assume for the scheduled PDSCH.

Alternatively, the indication of parameter lte-CRS-ToMatchAround can be achieved by associating the parameter to each CORESET, respectively. Thus, when receiving a PDSCH, the WD 22 such as via one or more of processing circuitry 84, processor 86, radio interface 82, resource mapping unit 34, etc., may apply the parameter lte-CRS-ToMatchAround associated with the CORESET including the PDCCH that scheduled the PDSCH. In one or more embodiments, the CRS may be associated with CORESET based at least in part on the parameter lte-CRS-ToMatchAround.

In a further embodiment, similar to the ones described above, the WD 22 such as via one or more of processing circuitry 84, processor 86, radio interface 82, resource mapping unit 34, etc., applies the union of the patterns received by the multiple parameters lte-CRS-ToMatchAround in case multiple PDCCHs are detected with different configurations of the parameter lte-CRS-ToMatchAround.

It should be noted that only a subset of all the scheduled PDSCHs may have a parameter lte-CRS-ToMatchAround because this parameter may only be configured if the TRP is also transmitting an LTE carrier (which may not be the case for all TRPs participating in the NC-JT transmission to the WD 22).

Embodiment three: WD (e.g., WD 22) procedures for PDSCH resource mapping when receiving multiple PDCCHs within the same slot and when the PDSCHs are at least partially overlapping in the time-domain are provided.

Figure 24:
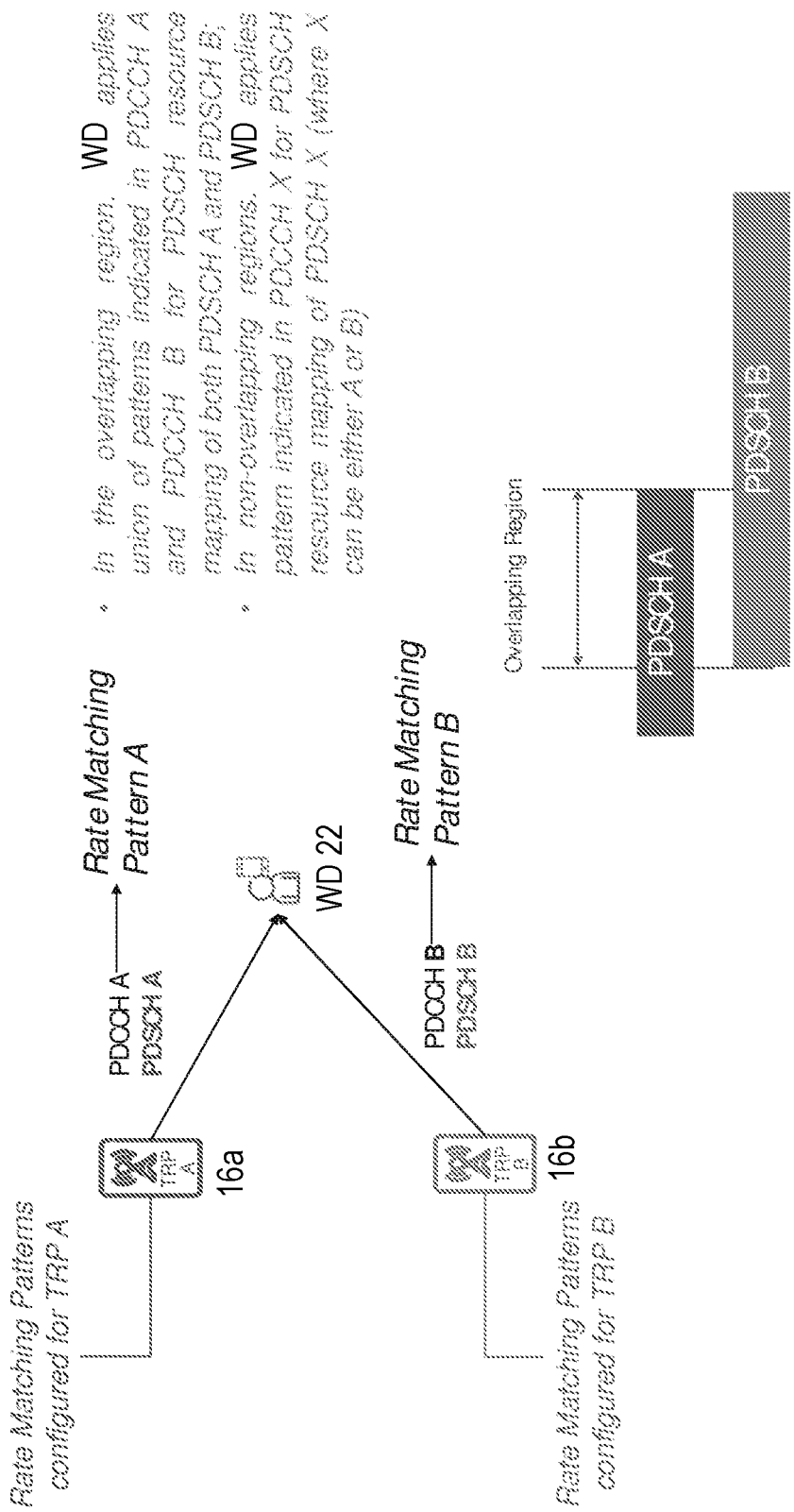
FIG. 24 shows an example of WD PDSCH resource mapping behavior when the different PDSCHs indicated by different PDCCHs received in the same slot are partially overlapping in time-domain according to one embodiment of the present disclosure.

In this embodiment, the WD 22 procedure for the case when PDSCHs indicated by multiple PDCCHs are at least partially overlapping the in time-domain are provided. In this case, the WD 22 such as via one or more of processing circuitry 84, processor 86, radio interface 82, resource mapping unit 34, etc., may apply different PDSCH resource mapping patterns in the overlapping region and the non-overlapping regions of the different PDSCHs. An example is shown in FIG. 24. In this example, the WD 22 such as via one or more of processing circuitry 84, processor 86, radio interface 82, resource mapping unit 34, etc., applies the union of rate matching patterns indicated in PDCCH A and PDCCH B for PDSCH resource mapping of both PDSCH A and PDSCH B in the overlapping time region. In the non-overlapping time regions, the WD 22 such as via one or more of processing circuitry 84, processor 86, radio interface 82, resource mapping unit 34, etc., applies the rate matching pattern indicated in PDCCH X for PDSCH resource mapping of PDSCH X (where X can be either A or B).

Embodiment four: Rate matching around NZP CSI-RS is provided.

Figure 25:
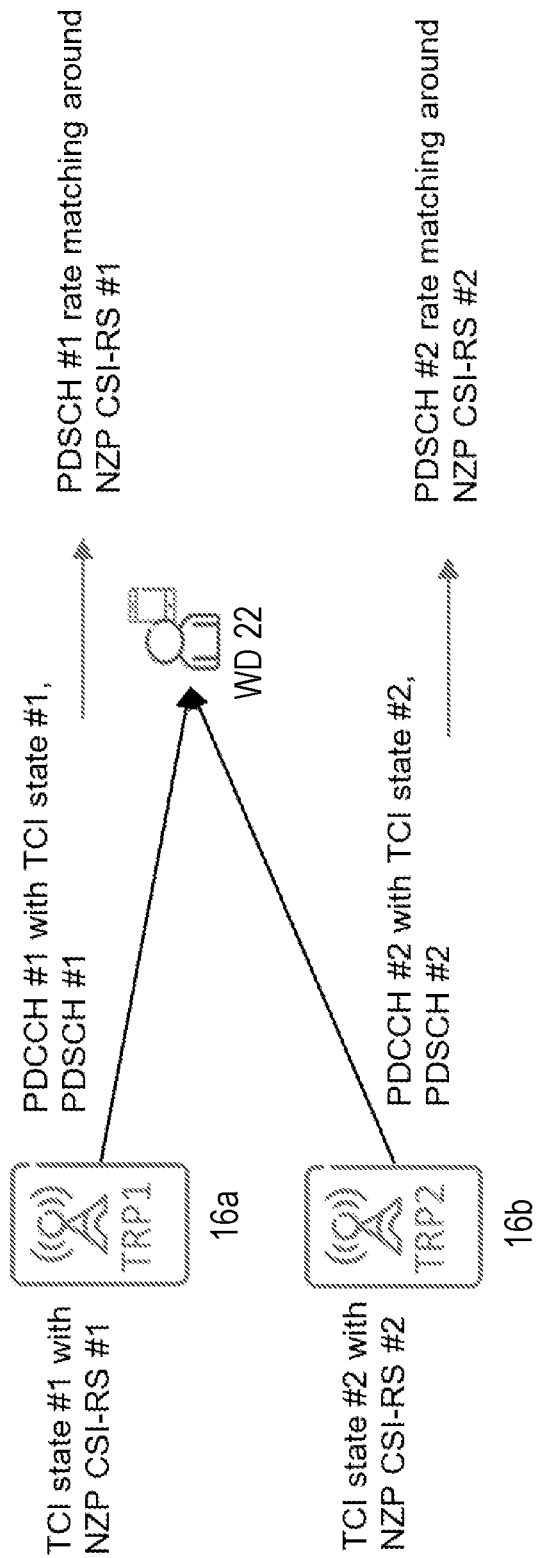
FIG. 25 shows an example of a TCI state based rate matching around NZP CSI-RS according to one embodiment of the present disclosure.

When two or more TRPs are used to send multiple PDCCHs and the associated PDSCHs to a WD 22, at least one NZP CSI-RS resource is generally configured for each TRP for channel state information measurement. In one scenario, an NZP CSI-RS resource or resource set to be rate matched around by a PDSCH may be indicated by the TCI bit field in the DCI scheduling the PDSCH. The TCI state may include the NZP CSI-RS resource or resource set for which the WD 22 assumes the corresponding NZP CSI-RS REs are not to be mapped to the PDSCH. An example is shown in FIG. 25. In one embodiment, if the source reference signal (RS) of the TCI state is NZP CSI-RS, then the WD 22 assumes that the PDSCH is not mapped to the NZP CSI-RS resource or resource set.

Some additional embodiments of the present disclosure may include one or more of the following embodiments:

1. A method of PDSCH-to-resource element mapping for transmission to a WD 22 when the WD 22 such as via one or more of processing circuitry 84, processor 86, radio interface 82, resource mapping unit 34, etc., receives multiple PDCCHs within a time-frequency resource scheduling a reception of one or more PDSCHs wherein
   at least two of the received PDSCHs may at least partially (e.g., partially or fully overlap) overlapping in the time domain;
   the one or more received PDSCHs may have either a common set of PDSCH resource mapping patterns configured by RRC or different sets of PDSCH resource mapping patterns configured by RRC; and/or
   the PDSCH resource mapping is performed by taking into account the PDSCH resource mapping information indicated in all or a subset of the received DCI messages from the received multiple PDCCHs.
2. The method of embodiment 1, where each PDCCH may be received in a different CORESET where each CORESET has an associated active TCI state.
3. The method of embodiment 2, where each CORESET with an associated active TCI state corresponds to a TRP or panel transmitting the PDCCH.
4. The method of any of embodiments 1-3, wherein the PDSCH resource mapping information indicated in DCI is in the 'Rate matching indicator' field.
5. The method of any of embodiments 1-3, wherein the PDSCH resource mapping information indicated in DCI is in the 'ZP CSI-RS trigger' field.

5.b The method of any of embodiments 1-3, wherein the PDSCH resource mapping information associated by the DCI is configured by the higher layer parameter lte-CRS-ToMatchAround 6. The method of any of embodiments 1-5, wherein the WD 22 such as via one or more of processing circuitry 84, processor 86, radio interface 82, resource mapping unit 34, etc., applies the PDSCH resource mapping pattern indicated in DCI to the PDSCH(s) corresponding to the PDCCH that carries the DCI message.
7. The method of any of embodiments 1-5, wherein the WD 22 such as via one or more of processing circuitry 84, processor 86, radio interface 82, resource mapping unit 34, etc., applies a joint pattern that is the union of the PDSCH resource mapping patterns indicated in all the received DCIs in the same downlink slot to the PDSCH(s) corresponding to all the received DCIs.
8. The method of any of embodiments 1-7, wherein a first PDSCH resource mapping pattern is applied to the PDSCHs in the time region where multiple PDSCHs overlap, and a second PDSCH resource mapping pattern is applied to the PDSCHs in the time region where different PDSCHs do not overlap.
9. The method of embodiment 1, where the time-frequency resource corresponds to a downlink slot
10. The method of embodiment 1, where the time-frequency resource corresponds to a set of CORESETs
11. The method of embodiments 1 to 3, where the PDSCH resource mapping further comprises of rate matching around NZP CSI-RS resource(s) indicated by the active TCI state.

Some Examples

Example A1. A network node 16 configured to communicate with a wireless device 22 (WD 22), the network node 16 configured to, and/or comprising a radio interface 62 and/or comprising processing circuitry 68 configured to cause the network node 16 to cause/perform one or more of:

transmit multiple physical downlink control channels (PDCCHs) within a time-frequency resource, the multiple PDCCHs including physical downlink shared channel (PDSCH) resource mapping information for mapping resources of one or more PDSCHs; and schedule and communicate the one or more PDSCHs according to the PDSCH resource mapping information included in the multiple PDCCHs.

Embodiment A2. The network node 16 of Embodiment A1, wherein the processing circuitry 68 is further configured to cause the network node to perform one or more of:

transmit each of the one or more PDSCHs at least partially overlapping in the time domain; and transmit each of the one or more PDSCHs with one of a common set of PDSCH resource mapping patterns and different sets of PDSCH resource mapping patterns.

Embodiment A3. The network node 16 of Embodiment A1, wherein the PDSCH resource mapping information is included in all or a subset of downlink control information (DCI) messages in the multiple PDCCHs.

Embodiment A4. The network node 16 of any one of Embodiments A1-A3, wherein each of the PDCCHs transmitted within the time-frequency resource is transmitted in a different control resource set (CORESET) and each CORESET is associated with an active transmission configuration indicator (TCI) state.

Embodiment A5. The network node 16 of Embodiment A4, wherein each CORESET with an active TCI state corresponds to one of a transmission point (TRP) and a panel, the one of the TRP and the panel transmitting the corresponding PDCCH.

Embodiment A6. The network node 16 of any one of Embodiments A1-A4, wherein the PDSCH resource mapping information is indicated in at least one downlink control information (DCI) message within the transmitted multiple PDCCHs.

Embodiment A7. The network node 16 of Embodiment A6, wherein the PDSCH resource mapping information indicated in the at least one DCI message includes at least one of a rate matching indicator field and a zero power (ZP) channel state information-reference signal (CSI-RS) trigger field.

Embodiment A8. The network node 16 of any one of Embodiments A6 and A7, wherein the PDSCH resource mapping information indicated by the at least one DCI message is configured via radio resource control (RRC) signaling.

Embodiment A9. The network node 16 of any one of Embodiments A1-A8, wherein the time-frequency resource corresponds to at least one of a slot and a set of CORESETs.

Embodiment A10. The network node 16 of any one of Embodiments A1-A9, wherein the PDSCH resource mapping information includes:

a PDSCH resource mapping pattern indicated in at least one downlink control information (DCI) message carried by a corresponding PDCCH.

Embodiment A11. The network node 16 of any one of Embodiments A1-A9, wherein the PDSCH resource mapping information included in downlink control information (DCI) messages in the transmitted multiple PDCCHs includes a joint pattern, the joint pattern being a union of PDSCH resource mapping patterns indicated in the DCI messages.

Embodiment A12. The network node 16 of any one of Embodiments A1-A11, wherein the PDSCH resource mapping information includes one or more of:

an indication of a first PDSCH resource mapping pattern to be applied by the WD in PDSCHs in a first time region; and an indication of a second PDSCH resource mapping pattern to be applied by the WD in PDSCHs in a second time region, the first time region associated with overlapping PDSCHs and the second time region associated with non-overlapping PDSCHs.

Embodiment A13. The network node 16 of any one of Embodiments A1-A12, wherein the PDSCH resource mapping information indicates rate matching around non-zero power (NZP CSI-RS) resources indicated by an active transmission configuration indicator (TCI) state.

Embodiment B1. A method for a network node 16, the method comprising one or more of:

transmitting multiple physical downlink control channels (PDCCHs) within a time-frequency resource, the multiple PDCCHs including physical downlink shared channel (PDSCH) resource mapping information for mapping resources of one or more PDSCHs; and scheduling and transmitting the one or more PDSCHs according to the PDSCH resource mapping information included in the multiple PDCCHs.

Embodiment B2. The method of Embodiment B1, further comprising one or more of:

transmitting each of the one or more PDSCHs at least partially overlapping in the time domain; and transmitting each of the one or more PDSCHs with one of a common set of PDSCH resource mapping patterns and different sets of PDSCH resource mapping patterns.

Embodiment B3. The method of Embodiment B1, wherein the PDSCH resource mapping information is included in all or a subset of downlink control information (DCI) messages in the multiple PDCCHs.

Embodiment B4. The method of any one of Embodiments B1-B3, wherein each of the PDCCHs transmitted within the time-frequency resource is transmitted in a different control resource set (CORESET) and each CORESET is associated with an active transmission configuration indicator (TCI) state.

Embodiment B5. The method of Embodiment B4, wherein each CORESET with an active TCI state corresponds to one of a transmission point (TRP) and a panel, the one of the TRP and the panel transmitting the corresponding PDCCH.

Embodiment B6. The method of any one of Embodiments B1-B4, wherein the PDSCH resource mapping information is indicated in at least one downlink control information (DCI) message within the transmitted multiple PDCCHs.

Embodiment B7. The method of Embodiment B6, wherein the PDSCH resource mapping information indicated in the at least one DCI message includes at least one of a rate matching indicator field and a zero power (ZP) channel state information-reference signal (CSI-RS) trigger field.

Embodiment B8. The method of any one of Embodiments B6 and B7, wherein the PDSCH resource mapping information indicated by the at least one DCI message is configured via radio resource control (RRC) signaling.

Embodiment B9. The method of any one of Embodiments B1-B8, wherein the time-frequency resource corresponds to at least one of a slot and a set of CORESETs.

Embodiment B10. The method of any one of Embodiments B1-B9, wherein the PDSCH resource mapping information includes:

a PDSCH resource mapping pattern indicated in at least one downlink control information (DCI) message carried by a corresponding PDCCH.

Embodiment B11. The method of any one of Embodiments B1-B9, wherein the PDSCH resource mapping information included in downlink control information (DCI) messages in the transmitted multiple PDCCHs includes a joint pattern, the joint pattern being a union of PDSCH resource mapping patterns indicated in the DCI messages.

Embodiment B12. The method of any one of Embodiments B1-B11, wherein the PDSCH resource mapping information includes one or more of:
  an indication of a first PDSCH resource mapping pattern to be applied by the WD 22 in PDSCHs in a first time region; and
  an indication of a second PDSCH resource mapping pattern to be applied by the WD 22 in PDSCHs in a second time region, the first time region associated with overlapping PDSCHs and the second time region associated with non-overlapping PDSCHs.

Embodiment B13. The method of any one of Embodiments B1-B12, wherein the PDSCH resource mapping information indicates rate matching around non-zero power (NZP CSI-RS) resources indicated by an active transmission configuration indicator (TCI) state.

Embodiment C1. A wireless device 22 (WD 22) configured to communicate with a network node 16, the WD 22 configured to, and/or comprising a radio interface and/or processing circuitry configured to cause/perform one or more of:
  receive multiple physical downlink control channels (PDCCHs) within a time-frequency resource, each of the multiple PDCCHs scheduling one or more physical downlink shared channels (PDSCHs); and
  perform PDSCH resource mapping for each of the one or more PDSCHs based on the received multiple PDCCHs.

Embodiment C2. The WD 22 of Embodiment C1, wherein the processing circuitry 68 is further configured to cause/perform one or more of:
  receive each of the one or more PDSCHs at least partially overlapping in the time domain; and
  receive each of the one or more PDSCHs with one of a common set of PDSCH resource mapping patterns and different sets of PDSCH resource mapping patterns.

Embodiment C3. The WD 22 of Embodiment C1, wherein the performance of the PDSCH resource mapping is based on all or a subset of downlink control information (DCI) messages in the received PDCCHs.

Embodiment C4. The WD 22 of any one of Embodiments C1-C3, wherein each of the PDCCHs received within the time-frequency resource is received in a different control resource set (CORESET) and each CORESET is associated with an active transmission configuration indicator (TCI) state.

Embodiment C5. The WD 22 of Embodiment C4, wherein each CORESET with an active TCI state corresponds to one of a transmission point (TRP) and a panel, the one of the TRP and the panel transmitting the corresponding PDCCH.

Embodiment C6. The WD 22 of any one of Embodiments C1-C4, wherein the performance of the PDSCH resource mapping is based on PDSCH resource mapping information indicated in at least one downlink control information (DCI) message from the received multiple PDCCHs.

Embodiment C7. The WD 22 of Embodiment C6, wherein the PDSCH resource mapping information indicated in the at least one DCI message includes at least one of a rate matching indicator field and a zero power (ZP) channel state information-reference signal (CSI-RS) trigger field.

Embodiment C8. The WD 22 of any one of Embodiments C6 and C7, wherein the PDSCH resource mapping information indicated by the at least one DCI message is configured via radio resource control (RRC) signaling.

Embodiment C9. The WD 22 of any one of Embodiments C1-C8, wherein the time-frequency resource corresponds to at least one of a slot and a set of CORESETs.

Embodiment C10. The WD 22 of any one of Embodiments C1-C9, wherein the processing circuitry 84 is configured to perform the PDSCH resource mapping for each of the one or more PDSCHs based on the received multiple PDCCHs by being further configured to cause/perform one or more of:
  identify at least one downlink control information (DCI) message from the received multiple PDCCHs; and
  apply a PDSCH resource mapping pattern indicated in the at least one DCI message to the PDSCH corresponding to the PDCCH carrying the DCI message.

Embodiment C11. The WD 22 of any one of Embodiments C1-C9, wherein the processing circuitry 84 is configured to perform the PDSCH resource mapping for each of the one or more PDSCHs based on the received multiple PDCCHs by being further configured to cause/perform one or more of:
  identify the downlink control information (DCI) messages from the received multiple PDCCHs; and
  apply a joint pattern to the PDSCHs corresponding to the DCI messages, the joint pattern being a union of PDSCH resource mapping patterns indicated in the DCI messages.

Embodiment C12. The WD 22 of any one of Embodiments C1-C11, wherein the processing circuitry 84 is configured to perform the PDSCH resource mapping for each of the one or more PDSCHs based on the received multiple PDCCHs by being further configured to cause/perform one or more of:
  apply a first PDSCH resource mapping pattern to PDSCHs in a first time region; and
  apply a second PDSCH resource mapping pattern to PDSCHs in a second time region, the first time region associated with overlapping PDSCHs and the second time region associated with non-overlapping PDSCHs.

Embodiment C13. The WD 22 of any one of Embodiments C1-C12, wherein the PDSCH resource mapping includes rate matching around non-zero power (NZP CSI-RS) resources indicated by an active transmission configuration indicator (TCI) state.

Embodiment D1. A method implemented in a wireless device 22 (WD 22), the method comprising one or more of:
  receiving multiple physical downlink control channels (PDCCHs) within a time-frequency resource, each of the multiple PDCCHs scheduling one or more physical downlink shared channels (PDSCHs); and
  performing PDSCH resource mapping for each of the one or more PDSCHs based on the received multiple PDCCHs.

Embodiment D2. The method of Embodiment D1, further comprising one or more of:
  receiving each of the one or more PDSCHs at least partially overlapping in the time domain; and
  receiving each of the one or more PDSCHs with one of a common set of PDSCH resource mapping patterns and different sets of PDSCH resource mapping patterns.

Embodiment D3. The method of Embodiment D1, wherein the performing the PDSCH resource mapping is based on all or a subset of downlink control information (DCI) messages in the received PDCCHs.

Embodiment D4. The method of any one of Embodiments D1-D3, wherein each of the PDCCHs received within the time-frequency resource is received in a different control resource set (CORESET) and each CORESET is associated with an active transmission configuration indicator (TCI) state.

Embodiment D5. The method of Embodiment D4, wherein each CORESET with an active TCI state corresponds to one of a transmission point (TRP) and a panel, the one of the TRP and the panel transmitting the corresponding PDCCH.

Embodiment D6. The method of any one of Embodiments D1-D4, wherein the performance of the PDSCH resource mapping is based on PDSCH resource mapping information indicated in at least one downlink control information (DCI) message from the received multiple PDCCHs.

Embodiment D7. The method of Embodiment D6, wherein the PDSCH resource mapping information indicated in the at least one DCI message includes at least one of a rate matching indicator field and a zero power (ZP) channel state information-reference signal (CSI-RS) trigger field.

Embodiment D8. The method of any one of Embodiments D6 and D7, wherein the PDSCH resource mapping information indicated by the at least one DCI message is configured via radio resource control (RRC) signaling.

Embodiment D9. The method of any one of Embodiments D1-D8, wherein the time-frequency resource corresponds to at least one of a slot and a set of CORESETs.

Embodiment D10. The method of any one of Embodiments D1-D9, wherein the performing the PDSCH resource mapping for each of the one or more PDSCHs based on the received multiple PDCCHs further comprises one or more of:
  identifying at least one downlink control information (DCI) message from the received multiple PDCCHs; and
  applying a PDSCH resource mapping pattern indicated in the at least one DCI message to the PDSCH corresponding to the PDCCH carrying the DCI message.

Embodiment D11. The method of any one of Embodiments D1-D9, wherein the performing the PDSCH resource mapping for each of the one or more PDSCHs based on the received multiple PDCCHs further comprises one or more of:
  identifying the downlink control information (DCI) messages from the received multiple PDCCHs; and
  applying a joint pattern to the PDSCHs corresponding to the DCI messages, the joint pattern being a union of PDSCH resource mapping patterns indicated in the DCI messages.

Embodiment D12. The method of any one of Embodiments D1-D11, wherein the performing the PDSCH resource mapping for each of the one or more PDSCHs based on the received multiple PDCCHs further comprises one or more of:
  applying a first PDSCH resource mapping pattern to PDSCHs in a first time region; and
  applying a second PDSCH resource mapping pattern to PDSCHs in a second time region, the first time region associated with overlapping PDSCHs and the second time region associated with non-overlapping PDSCHs.

Embodiment D13. The method of any one of Embodiments D1-D12, wherein the PDSCH resource mapping includes rate matching around non-zero power (NZP CSI-RS) resources indicated by an active transmission configuration indicator (TCI) state.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++.

However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale.

A variety of modifications and variations are possible in light of the above teachings without departing from the scope of the following claims.

What is claimed is:

1. A wireless device, comprising:
    processing circuitry configured to:
        receive a plurality of physical downlink control channel, PDCCH, transmissions, the plurality of PDCCH transmissions including a plurality of downlink control information, DCI, messages scheduling a plurality of physical downlink shared channel, PDSCH, transmissions, at least two of the plurality of PDSCH transmissions one of partially and fully overlap in a time domain, each of the plurality of DCI messages is detected within a respective control resource set, CORESET, of a plurality of CORESETs, each CORESET being associated with a CORESET group identifier and at least one common reference signal, CRS, pattern; and
        perform PDSCH resource mapping for decoding the plurality of PDSCH transmissions based at least in part on the plurality of DCI messages, the PDSCH resource mapping based at least in part on a union of the CRS patterns associated with the CORESET group identifier of the CORESET in which the DCI scheduling the PDSCH is detected.

2. A method implemented by a wireless device, the method comprising:
    receiving a plurality of physical downlink control channel, PDCCH, transmissions, the plurality of PDCCH transmissions including a plurality of downlink control information, DCI, messages scheduling a plurality of physical downlink shared channel, PDSCH, transmissions, at least two of the plurality of PDSCH transmissions one of partially and fully overlap in a time domain, each of the plurality of DCI messages is detected within a respective control resource set, CORESET, of a plurality of CORESETs, each CORESET being associated with a CORESET group identifier and at least one common reference signal, CRS, pattern; and
    performing PDSCH resource mapping for decoding the plurality of PDSCH transmissions based at least in part on the plurality of DCI messages, the PDSCH resource mapping based at least in part on a union of the CRS patterns associated with the CORESET group identifier of the CORESET in which the DCI scheduling the PDSCH is detected.

3. The method of claim 2, wherein each of the plurality of CORESETs are associated with a corresponding CRS parameter indicating the at least one CRS pattern.

4. The method of claim 2, wherein each CRS pattern indicates resources that are unavailable for PDSCH to resource element mapping.

5. The method of claim 2, wherein a plurality of common reference signal, CRS, patterns for the PDSCH resource mapping are configured, the PDSCH resource mapping being performed based at least in part on the union of the configured plurality of CRS patterns when the plurality of DCI messages are detected at the wireless device.

6. The method of claim 2, wherein each of the plurality of DCI messages indicates a resource element, RE, level PDSCH resource mapping information, the PDSCH resource mapping being performed based at least in part on the RE-level PDSCH resource mapping information indicated by each of the plurality of DCI messages.

7. The method of claim 2, wherein each of the plurality of DCI messages indicates at least one zero power channel state information-reference signal, ZP CSI-RS, resource for PDSCH resource mapping, the PDSCH resource mapping for each of the plurality of PDSCHs being based at least in part on the at least one ZP CSI-RS resource indicated by the respective DCI scheduling each PDSCH.

8. The method of claim 2, wherein at least one zero power channel state information-reference signal, ZP CSI-RS, resource is indicated via a ZP CSI-RS trigger.

9. A method implemented by a system, the method comprising:
    causing, at each of a plurality of network nodes (16), a physical downlink control channel, PDCCH, transmission, the PDCCH transmission including a downlink control information, DCI, message scheduling a physical downlink shared channel, PDSCH, transmission, each of the plurality of DCI messages is detected within a respective control resource set, CORESET, of a plurality of CORESETs, each CORESET being associated with a CORESET group identifier and at least one common reference signal, CRS, pattern; and
    causing, at each of the plurality of network nodes, the PDSCH transmission for decoding by the wireless device using at least in part PDSCH resource mapping based at least in part on the DCI messages from the plurality of network nodes (16), at least two of the scheduled PDSCH transmissions one of partially and fully overlap in a time domain, the PDSCH resource mapping based at least in part on a union of the CRS patterns associated with the CORESET group identifier of the CORESET in which the DCI scheduling the PDSCH is detected.

10. The method of claim 9, wherein each of the plurality of CORESETs are associated with a CRS parameter indicating the at least one CRS pattern.

11. The method of claim 9, wherein each CRS pattern indicates resources that are unavailable for PDSCH to resource element mapping.

12. The method of claim 9, wherein a plurality of common reference signal, CRS, patterns for PDSCH resource mapping are configured, the PDSCH resource mapping being based at least in part on the union of the configured plurality of CRS patterns when the plurality of DCI messages are detected at the wireless device.

13. The method of claim 9, wherein each of the DCI messages indicates a resource element, RE, level PDSCH resource mapping information, the PDSCH resource mapping being based at least in part on the RE-level PDSCH resource mapping information indicated by each of the DCI messages.

14. The method of claim 9, wherein each of the DCI messages indicates at least one zero power channel state information-reference signal, ZP CSI-RS, resource for PDSCH resource mapping, the PDSCH resource mapping for each PDSCH being based at least in part on the at least one ZP CSI-RS resource indicated by the respective DCI scheduling each PDSCH.

15. The method of claim 9, wherein at least one zero power channel state information-reference signal, ZP CSI-RS, resource is indicated via a ZP CSI-RS trigger.

16. The method of claim 9, wherein the PDCCH transmissions are received within a communication slot.

\* \* \* \* \*